(12) United States Patent
Patil et al.

(10) Patent No.: US 12,522,545 B2
(45) Date of Patent: Jan. 13, 2026

(54) CERAMIC CEMENT MIXTURE AND CERAMIC HONEYCOMB WITH CERAMIC CEMENT SKIN

(71) Applicant: CORNING INCORPORATED, Corning, NY (US)

(72) Inventors: Mallanagouda Dyamanagouda Patil, Corning, NY (US); Cameron Wayne Tanner, Horseheads, NY (US); James William Zimmermann, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 587 days.

(21) Appl. No.: 17/919,338

(22) PCT Filed: Apr. 27, 2021

(86) PCT No.: PCT/US2021/029313
§ 371 (c)(1),
(2) Date: Oct. 17, 2022

(87) PCT Pub. No.: WO2021/222187
PCT Pub. Date: Nov. 4, 2021

(65) Prior Publication Data
US 2023/0159401 A1 May 25, 2023

Related U.S. Application Data

(60) Provisional application No. 63/017,969, filed on Apr. 30, 2020.

(51) Int. Cl.
*C04B 41/81* (2006.01)
*C04B 14/06* (2006.01)
*C04B 14/30* (2006.01)
*C04B 20/00* (2006.01)
*C04B 22/00* (2006.01)
*C04B 22/06* (2006.01)
*C04B 103/00* (2006.01)

(52) U.S. Cl.
CPC ............ *C04B 41/81* (2013.01); *C04B 14/062* (2013.01); *C04B 14/303* (2013.01); *C04B 20/0048* (2013.01); *C04B 22/0093* (2013.01); *C04B 22/062* (2013.01); *C04B 2103/0079* (2013.01); *C04B 2103/0094* (2013.01)

(58) Field of Classification Search
CPC ..... C04B 41/81; C04B 14/062; C04B 14/303; C04B 20/0048; C04B 22/0093; C04B 22/062; C04B 41/009; C04B 41/5089; C04B 41/85; C04B 2103/0079; C04B 2103/0094; C04B 2111/00793; F01N 3/2828; F01N 2330/06
See application file for complete search history.

(56) References Cited

U.S. PATENT DOCUMENTS

| | | | |
|---|---|---|---|
| 7,083,842 B2 | 8/2006 | Masukawa et al. | |
| 7,560,154 B2 | 7/2009 | Katoh | |
| 8,021,739 B2 | 9/2011 | Nedelec | |
| 8,334,043 B2 | 12/2012 | Cai et al. | |
| 8,480,780 B2 * | 7/2013 | Kudo | B01D 46/2425 55/524 |
| 8,518,857 B2 | 8/2013 | Bliss et al. | |
| 8,999,483 B2 | 4/2015 | Chapman et al. | |
| 9,028,946 B2 | 5/2015 | Cai et al. | |
| 9,067,831 B2 | 6/2015 | Chapman et al. | |
| 9,139,479 B2 | 9/2015 | Chapman et al. | |
| 9,789,633 B2 | 10/2017 | Akarapu et al. | |
| 9,828,298 B2 | 11/2017 | Deneka et al. | |
| 2006/0225390 A1 | 10/2006 | Yoshida | |
| 2006/0292044 A1 | 12/2006 | Ohno et al. | |
| 2007/0178275 A1 | 8/2007 | Takahashi | |
| 2007/0234693 A1 | 10/2007 | Miao et al. | |
| 2008/0124504 A1 | 5/2008 | Faber et al. | |

(Continued)

FOREIGN PATENT DOCUMENTS

| | | |
|---|---|---|
| CN | 1883909 A | 12/2006 |
| CN | 1926313 A | 3/2007 |

(Continued)

OTHER PUBLICATIONS

Ludox® Colloidal Silica Product Information Sheet https://www.chempoint.com/products/grace/ludox-monodispersed-colloidal-silica © 2008-2025 (Year: 2008).*
G.G. Stoney, "The Tension of Metallic Films Deposited by Electrolysis," Proceedings of the Royal Society of London, Series A, Jan. 16, 1909, pp. 172-175.
International Preliminary Report on Patentability of the International Searching Authority; PCT/US2021/029313; mailed on Nov. 10, 2022; 10 pages; European Patent Office.
International Search Report and Written Opinion of the International Searching Authority; PCT/US2021/029313; mailed on Sep. 10, 2021, 17 pages; European Patent Office.

(Continued)

*Primary Examiner* — Anthony J Green
(74) *Attorney, Agent, or Firm* — Kevin M Able

(57) ABSTRACT

A cement composition for application to a ceramic substrate, such as a cement skin composition for application to a ceramic honeycomb body is provided. The cement composition includes a first source of inorganic particles having a mean particle diameter <50 nm, wherein the first source of inorganic particles is present at about <15% (by dry weight), a second source of inorganic particles having a mean particle diameter of from about 50 nm to about 700 nm, wherein the second source of inorganic particles is present at from about 5% to about 15% (by dry weight), and a water-soluble organic binder. An inorganic fibrous material can be present at about <15% (based on dry weight). The amount of at least one of the first source of inorganic particles or the inorganic fibrous material is greater than 0% (by dry weight).

20 Claims, 15 Drawing Sheets

(56) References Cited

U.S. PATENT DOCUMENTS

| | | |
|---|---|---|
| 2009/0033005 A1 | 2/2009 | Bookbinder et al. |
| 2014/0127412 A1 | 5/2014 | Vosejpka et al. |
| 2014/0295132 A1 | 10/2014 | Okazaki |
| 2015/0337701 A1 | 11/2015 | Chapman et al. |
| 2015/0352748 A1 | 12/2015 | Akarapu et al. |
| 2018/0044250 A1 | 2/2018 | Okazaki |

FOREIGN PATENT DOCUMENTS

| | | | | |
|---|---|---|---|---|
| CN | 101309883 A | | 11/2008 | |
| CN | 101443288 A | | 5/2009 | |
| CN | 101541710 A | | 9/2009 | |
| CN | 101801879 A | | 8/2010 | |
| CN | 103702960 A | | 4/2014 | |
| CN | 103889929 A | | 6/2014 | |
| CN | 106488896 A | | 3/2017 | |
| CN | 106519831 A | * | 3/2017 | ........... C09D 5/1687 |
| CN | 106573850 A | | 4/2017 | |
| CN | 108550801 A | * | 9/2018 | ............. H01M 4/13 |
| EP | 3151942 A1 | | 4/2017 | |
| WO | 2013/090214 A2 | | 6/2013 | |
| WO | 2015/168530 A1 | | 11/2015 | |

OTHER PUBLICATIONS

Invitation to Pay Additional Fees of the International Searching Authority; PCT/US2021/029313; mailed on Jul. 22, 2021, 8 pages; European Patent Office.

J. Webb, et al., "Strength Size Effects in Cellular Ceramic Structures," Ceramic Engineering and Science Proceedings—Mechanical Properties and Performance of Engineering Ceramics II, vol. 27, Issue 2, 2006, pp. 521-531.

J.M. Gere, et al., Mechanics of Materials, Second Edition, PWS-Kent Publishing Company, Boston, MA, ISBN 0-534-03099-8, 1984, pp. 252.

R.K. Iler, "Coacervates of Polyvinyl Alcohol and Colloidal Silica", J. Colloid and Interface Sci., vol. 51, No. 3, 1975, pp. 388-393.

S. Gulati, "Strength and Thermal Shock Resistance of Segmented Wall-Flow Diesel Filters," SAE Technical Paper, 860008, Mar. 1, 1986. pp 1-12.

S.P. Timoshenko, "Analysis of Bi-Metal Thermostats", J. Opt. Soc. Am., vol. 11, 1925, pp. 233-255.

T. Mizutani, et al., "The Study for Structural Design of the Segmented SiC-DPF," SAE Technical Paper, 2006, pp. 1-10.

European Patent Application No. 21727962.9 Communication pursuant to Article 94(3) EPC dated Jun. 25, 2025; 9 Pages; European Patent Office.

Chinese Patent Application No. 202180032258.8, Office Action dated Apr. 26, 2023, 5 pages (English Translation only), Chinese Patent Office.

* cited by examiner

CERAMIC CEMENT MIXTURE AND CERAMIC HONEYCOMB WITH CERAMIC CEMENT SKIN

CROSS REFERENCE TO RELATED APPLICATION

This is a national stage application under 35 U.S.C. § 371 of International Application No. PCT/US2021/029313, filed on Apr. 27, 2021, which claims the benefit of priority under 35 U.S.C § 119 of U.S. Provisional Application Ser. No. 63/017,969 filed on Apr. 30, 2020, the content of which is relied upon and incorporated herein by reference in their entireties.

FIELD

The present disclosure generally relates to a ceramic cement mixture, or cement composition, for application to a ceramic body such as a cellular ceramic body such as a ceramic honeycomb body such as for a substrate or filter, and more specifically, to a cement mixture for application to a ceramic honeycomb body such as to form an outer peripheral wall or skin.

BACKGROUND

Cellular ceramic articles, such as ceramic honeycombs, can be utilized as substrates in catalytic and adsorption applications, such as in catalytic converters, catalyst supports, gas filtration, and particulate filtration. Ceramic honeycombs can be prepared by mixing powdered ceramic precursor materials with a binder and optional solvent to form a ceramic precursor composition that can be shaped to form a green body. The green body is then fired to produce the ceramic honeycomb. Ceramic honeycombs are typically shaped by extrusion through an extrusion die and usually include a skin around an exterior of a body of the honeycomb. The skin may be directly extruded onto the cellular ceramic and may have the same composition as the honeycomb body. Alternatively, a cement skin composition can be extruded onto the ceramic honeycomb or applied using other methods, such as spray casting.

Cement skin compositions are often applied to the ceramic honeycomb as a wet cement paste and dried, usually in heated conditions. Cracks can occur during the process which may require patching or in some cases may result in rejection of the article as unsuitable for its intended use. In addition, in some applications the cement skin may experience high temperatures and/or temperature fluctuations after drying which may cause the cement skin to weaken and/or crack.

In view of these considerations, there is a need for a cement composition for application to a ceramic substrate, and more specifically, a need for a cement skin composition for application to a ceramic honeycomb which can exhibit resistance to cracking during processing, such as drying, and/or under use conditions such as exposure to elevated temperatures or thermal shock due to temperature changes.

SUMMARY

The present disclosure generally relates to a ceramic cement mixture, or cement composition, for application to a ceramic body such as a cellular ceramic body such as a ceramic honeycomb body such as for a substrate or filter, and more specifically, to a cement mixture for application to a ceramic honeycomb body such as to form an outer peripheral wall or skin.

According to an aspect of the present disclosure, a cement composition for application to a ceramic substrate includes a first source of inorganic particles having a mean particle diameter <50 nm, wherein the first source of inorganic particles is present at about ≤15% (by dry weight) and a second source of inorganic particles having a mean particle diameter of from about 50 nm to about 700 nm, wherein the second source of inorganic particles is present at from about 5% to about 15% (by dry weight). The composition can include an inorganic fibrous material present at about ≤15% (based on dry weight) and a water-soluble organic binder, wherein the amount of at least one of the first source of inorganic particles or the inorganic fibrous material is greater than 0% (by dry weight).

According to another aspect of the present disclosure, a honeycomb structure includes a ceramic honeycomb body comprising opposing first and second end faces and a plurality of intersecting walls defining a plurality of cells extending axially between the first and second end faces and a cement skin disposed on at least a portion of a periphery of the body. The cement skin is derived from a composition including a first source of inorganic particles having a mean particle diameter <50 nm, wherein the first source of inorganic particles is present at about ≤15% (by dry weight) and a second source of inorganic particles having a mean particle diameter of from about 50 nm to about 700 nm, wherein the second source of inorganic particles is present at from about 5% to about 15% (by dry weight). The cement skin composition can include an inorganic fibrous material present at about ≤15% (based on dry weight) and a water-soluble organic binder, wherein the amount of at least one of the first source of inorganic particles or the inorganic fibrous material is greater than 0% (by dry weight).

These and other aspects, objects, and features of the present disclosure will be understood and appreciated by those skilled in the art upon studying the following specification, claims, and appended drawings.

DETAILED DESCRIPTION

Figure 2:
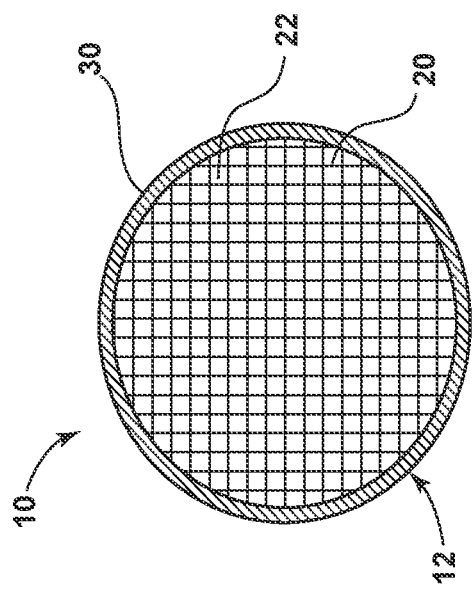
FIG. 2 is a front view of the honeycomb structure of FIG. 1, according to an aspect of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein, the language "free" or "substantially free," when used to describe a constituent of a composition, batch, melt, or article, refers to a constituent that is not actively added, formed, or batched into the composition, batch, melt, or article, but which may be present in a small as a contaminant and/or due to the inherent degree of uncertainty attributed to any measurement or analysis technique.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

The term "formed from" can mean one or more of comprises, consists essentially of, or consists of. For example, a component that is formed from a particular material can comprise the particular material, consist essentially of the particular material, or consist of the particular material.

Aspects of the present disclosure relate to cement compositions that can be used to form a cement skin having the desired mismatch strain, cracking rate, strength, and/or thermal stability characteristics. The cement compositions of the present disclosure include a first source of inorganic particles having a mean particle diameter <50 nm, wherein the first source of inorganic particles is present at about ≤15% (by dry weight), a second source of inorganic particles having a mean particle diameter of from about 50 nm to about 700 nm, wherein the second source of inorganic particles is present at from about 5% to about 15% (by dry weight), an inorganic fibrous material present at about ≤15% (based on dry weight), and a water-soluble organic binder, wherein the amount of at least one of the first source of inorganic particles or the inorganic fibrous material is greater than 0% (by dry weight). When present, the first source of inorganic particles may be a colloidal inorganic binder. In some examples, the cement composition is free of the first source of inorganic particles, and includes the inorganic fibrous material. In other examples, the cement composition is free of the inorganic fibrous material, and includes the first source of inorganic particles. In still other examples, the cement composition can include both the first source of inorganic particles and the inorganic fibrous material, both being present at low concentrations (e.g., ≤15% based on dry weight).

The cement compositions of the present disclosure can be used to form a cement skin for a cellular ceramic structure that is less likely to crack when dried compared to a HFS cement skin. The cement skin of the present disclosure can exhibit an improvement in tensile mismatch strain between the cement skin and the underlying ceramic substrate under a variety of different conditions compared to a HFS cement skin. The cement composition of the present disclosure can also be characterized by similar or improved strength and/or thermal stability characteristics. The cement composition and cement skin according to the present disclosure can be characterized by an improvement in a tensile mismatch strain between the cement skin and the ceramic substrate, which may decrease the likelihood of cracking during drying of the cement skin. An improvement in the mismatch strain can include a decrease in tensile strain or a transition from tensile strain to compressive strain. Generally, mismatch strain values <0 represent a tensile mismatch strain and mismatch strain values >0 represent compressive mismatch strain. Increases in the tensile mismatch strain between the cement skin and the underlying ceramic substrates can increase the likelihood of the formation of cracks in the cement skin. The improvement in mismatch strain between the cement skin and the ceramic substrate may also decrease the likelihood of cracking of the cement skin in end-use applications that involve heating and cooling the ceramic substrate, such as may be experienced in an engine environment.

The mismatch strain between the cement skin and the ceramic substrate can be affected by a process by which the applied cement skin is dried, a thermal history of the cement skin, and/or dimensional changes of the cement skin. The dimensions of the skin may change for a variety of reasons, examples of which include due to pyrolysis of organic material in the skin and/or sintering of colloidal inorganic particles during drying and/or end-use applications that involve heating the skin. The cement skin is most likely to shrink upon drying after application to the ceramic substrate, which results in some degree of residual tension as applied. The behavior of the underlying ceramic substrate can also affect the applied cement skin. For example, the ceramic substrate may exhibit thermal expansion when heated, resulting in dimensional changes that can increase the tensile mismatch strain of the cement skin. The porous microstructure of the underlying ceramic substrate may exert capillary forces on liquid present in the applied wet cement skin as it dries. The capillary forces may result in the formation of drying fronts and variations in drying time that may result in an increase in the mismatch strain of the cement skin, which may increase the likelihood of cracking.

Figure 1:
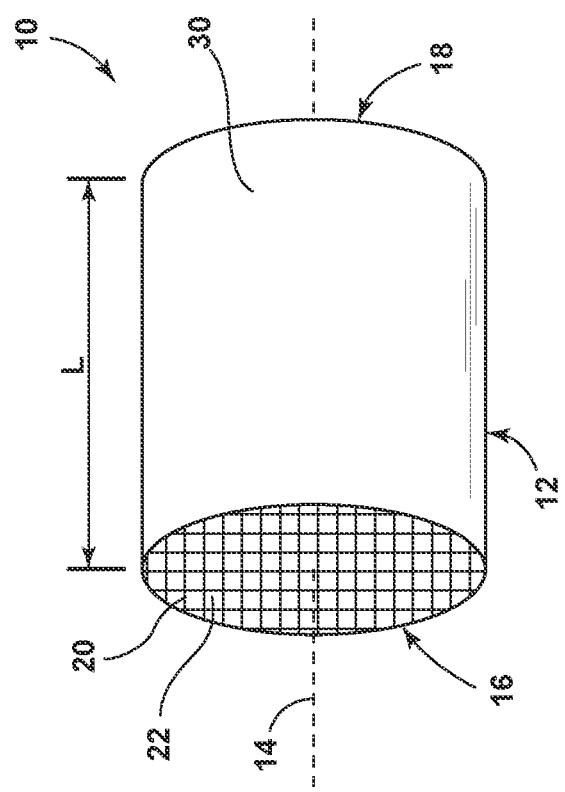
FIG. 1 is a perspective view of a honeycomb structure including a honeycomb body and a cement skin, according to an aspect of the present disclosure.

FIGS. 1-2 illustrate an exemplary ceramic substrate according to aspects of the present disclosure in the form of a honeycomb structure 10. The honeycomb structure 10 includes a body 12 that extends along a longitudinal axis 14 between opposing first and second end faces 16 and 18. The body 12 includes a plurality of intersecting walls 20 that define a plurality of cells 22 extending axially between the first and second end faces 16, 18 along the longitudinal axis 14. A cement skin 30 is disposed on at least a portion of a periphery of the body 12 between the first and second end faces 16, 18. While the cement skin 30 is illustrated as covering the entire periphery of the body 12 over the entire distance between the first and second end faces 16, 18, it is understood that the cement skin 30 may be disposed over only a portion of the periphery and/or may extend over only a portion of the distance between the first and second end faces 16, 18.

The dimensions and physical characteristics of the honeycomb structure 10 can be selected based on the intended use of the honeycomb structure 10. For example, the honeycomb structure 10 can have a cell density of from about 4 cells/cm$^2$ to about 300 cells/cm$^2$. In another example, a thickness of the walls 20 forming the cells 22 is from about 0.04 mm to about 0.5 mm. While the cells 22 are illustrated as having a generally square cross-sectional shape, it is within the scope of the present disclosure for the cells 22 to have other geometric cross-sectional shapes, non-limiting examples of which include hexagonal, triangular, and rectangular.

The honeycomb structure 10 can be formed from a ceramic material, examples of which include cordierite, mullite, alumina, silicon carbide, and aluminum titanate. The honeycomb structure 10 can be formed according to any conventional process suitable for forming a honeycomb monolithic body. In one example, a ceramic precursor batch composition can be shaped into a green body according to any known process, examples of which include extrusion, injection molding, slip casting, centrifugal casting, pressure casting, and dry pressing. The shaped green body can then be fired to form a ceramic structure. In some examples, the honeycomb structure 10 may be shaped to a desired shape and dimension by selectively removing material. Non-limiting examples of shaping techniques for providing the honeycomb structure 10 with the desired shape and dimensions include cutting, sanding, and grinding. Optionally, one or more of the cells 22 can be plugged with a plugging material.

The cement skin 30 can have any suitable thickness based on the intended use of the honeycomb structure 10. In one example, the cement skin 30 can have an average thickness of from about 0.5 mm to about 3 mm. As used herein, the average thickness of the cement skin refers to a thickness averaged over a perimeter of the body 12. For example, the cement skin 30 can have an average thickness around the perimeter of the body 12 of from about 0.5 mm to about 3 mm, about 0.5 mm to about 2.5 mm, about 0.5 mm to about 2 mm, about 0.5 mm to about 1.5 mm, about 1 mm to about 3 mm, about 1 mm to about 2.5 mm, about 1 mm to about 2 mm, about 1.5 mm to about 3 mm, or about 1.5 mm to about 2.5 mm. In some examples the cement skin 30 can have an average thickness around the perimeter of the body 12 of about 0.5 mm, about 1 mm, about 1.5 mm, about 1.6 mm, about 1.7 mm, about 1.8 mm, about 1.9 mm, about 2 mm, about 2.1 mm, about 2.5 mm, about 3 mm, or any thickness value between these values.

The cement skin 30 can be derived from a cement composition that includes a first source of inorganic particles having a mean particle diameter <50 nm and/or an inorganic fibrous material, a second source of inorganic particles having a mean particle diameter of from about 50 nm to about 700 nm, and a water-soluble organic binder. The inorganic particles of the first source, which have a mean particle diameter <50 nm, can be considered small or fine inorganic particles compared to the inorganic particles of the second source, which have a mean particle diameter of from about 50 nm to about 700 nm, and which can be referred to as intermediate inorganic particles. In many examples of the cement composition, the cement composition includes a third source of inorganic particles having a diameter >1 μm, which can be referred to as large inorganic particles with respect to the fine inorganic particles and intermediate inorganic particles of the first and second sources of inorganic particles, respectively.

The first source of inorganic particles has a mean particle diameter ("$d_{50}$")<50 nm and are present at about ≤15% (by dry weight) of the cement composition. In some examples, the cement composition is free of the first source of inorganic particles, in which case the cement composition can include the inorganic fibrous material, discussed below. The first source of inorganic particles can be an inorganic binder that includes colloidal silica, colloidal alumina, or combinations thereof. As used herein, the term "colloidal" with respect to inorganic particles refers to inorganic particles that are suspended within a suitable liquid, an example of which includes water.

According to one aspect, the first source of inorganic particles is present at about ≤15%, about ≤12%, about ≤10%, about 9%, about ≤6%, about ≤4%, or about ≤3% (by dry weight). For example, the first source of inorganic particles can be present at from about 0% to about 15%, about 1% to about 15%, about 2% to about 15%, about 3% to about 15%, about 4% to about 15%, about 5% to about 15%, about 6% to about 15%, about 9% to about 15%, about 10% to about 15%, about 12% to about 15%, about 0% to about 12%, about 1% to about 12%, about 2% to about 12%, about 3% to about 12%, about 4% to about 12%, about 5% to about 12%, about 6% to about 12%, about 9% to about 12%, about 0% to about 10%, about 1% to about 10%, about 2% to about 10%, about 3% to about 10%, about 4% to about 10%, about 5% to about 10%, about 6% to about 10%, about 0% to about 9%, about 1% to about 9%, about 2% to about 9%, about 3% to about 9%, about 4% to about 9%, about 5% to about 9%, about 6% to about 9%, about 0% to about 6%, about 1% to about 6%, about 2% to about 6%, about 3% to about 6%, or about 4% to about 6% (by dry weight).

The first source of inorganic particles can be characterized by a mean particle diameter $d_{50}$<50 nm. In some examples, the first source of inorganic particles can be characterized by a mean particle diameter $d_{50}$<40 nm, <30 nm, or <20 nm. Unless otherwise noted, as used herein, mean particle diameter $d_{50}$ refers to an average particle diameter of a population of particles as determined using laser light scattering. In one example, the mean particle diameter $d_{50}$ can be determined using a Microtrac S3500 laser diffraction particle size analyzer. Prior to measurement in the particle size analyzer, the particles can be diluted in water and sonicated in an ultrasonic water bath for about 5 minutes to disperse the particles for analysis. The run time in the particle analyzer can be set to 30 seconds. It will be understood that alternative conditions for dispersing and measuring the particle size can be used based on the type of particle, the size of the particle, and/or the instrument used, with any necessary scaling.

Examples of a commercially available first source of inorganic particles include Ludox® HS40 colloidal silica and Ludox® PW-50 colloidal silica, both available from W.R. Grace & Co. Ludox® HS40 is described by the manufacturer as a suspension of 40 wt % silica particles in water, the silica particles having a mean particle diameter $d_{50}$ of 12 nm. Ludox® PW-50 is described by the manufacturer as a suspension of 50 wt % silica particles in water, the silica particles having a mean particle diameter $d_{50}$ of 40 nm.

According to one aspect, the cement composition can include a second source of inorganic particles having a mean particle diameter of from about 50 nm to about 700 nm. The second source of inorganic particles can be present at from about 5% to about 15% of the cement composition (by dry weight). The second source of inorganic particles can be silica, alumina, titania, spinel, zirconia, or combinations thereof. In one example, the second source of inorganic particles can be silica soot particles that are a by-product of a flame hydrolysis process used to form high purity fused silica. The second source of inorganic particles can be used in the cement composition in combination with the first source of inorganic particles or in the absence of the first source of inorganic particles. The second source of inorganic particles can have a mean particle diameter of from about 50 nm to about 700 nm, about 50 nm to about 600 nm, about 50 nm to about 500 nm, about 50 nm to about 400 nm, about 50 nm to about 300 nm, about 50 nm to about 200 nm, about 100 nm to about 700 nm, about 100 nm to about 600 nm, about 100 nm to about 500 nm, about 100 nm to about 400 nm, about 100 nm to about 300 nm, about 100 nm to about 200 nm, about 200 nm to about 700 nm, about 200 nm to about 600 nm, about 200 nm to about 500 nm, about 200 nm to about 400 nm, about 200 nm to about 300 nm, about 300 nm to about 700 nm, about 300 nm to about 600 nm, about 300 nm to about 500 nm, about 300 nm to about 400 nm, about 400 nm to about 700 nm, about 400 nm to about 600 nm, about 400 nm to about 500 nm, about 500 nm to about 700 nm, or about 500 nm to about 600 nm.

According to one aspect of the present disclosure, the second source of inorganic particles is present in an amount of from about 5% to about 15% of the cement composition (by dry weight). In some aspects, the second source of inorganic particles can be present in an amount of from about 5% to about 15%, about 5% to about 12%, about 5% to about 10%, about 5% to about 8%, about 8% to about 15%, about 8% to about 12%, about 8% to about 10%, about 10% to about 15%, or about 10% to about 12% of the cement composition (by dry weight). For example, the second source of inorganic particles can be present in an amount of about 5%, about 6%, about 7%, about 8%, about 9%, about 10%, about 11%, about 12%, about 13%, about 14%, about 15% of the cement composition (by dry weight), or any amount between these values.

The first source of inorganic particles can provide strength to the cement skin 30 after the organic material is burned away, such as can occur during drying processes, durability testing, and/or during end-use of the honeycomb structure 10 in which high temperatures are involved. The first source of inorganic particles can facilitate binding inorganic filler and fibrous material to one another and may also facilitate binding of the cement skin 30 to the material of the honeycomb body 12. Fine colloidal particles, such as the first source of inorganic particles having a mean particle diameter <50 nm, can have low miscibility with other components of the cement composition, such as the water-soluble organic binder, which in some cases can result in separation of the composition into two separate liquid phases: a high viscosity phase with the majority of the organic binder and a low viscosity colloidal suspension. This phase separation phenomenon may increase the likelihood that the skin will crack while drying and/or reduce the strength of the interaction between the skin and the ceramic substrate. In addition, the lower viscosity colloidal suspension phase of the composition may result in the fine colloidal particles migrating into the ceramic substrate and/or concentration of the fine colloidal particles at the drying front near an interface between an exterior surface of the skin and air. In some cases, migration of the fine colloidal particles into the ceramic substrate may affect the properties of the ceramic substrate. Concentration gradients of the fine colloidal particles within the cement skin may affect the strength of the cement skin and/or result in non-uniform shrinkage of the cement skin during drying and/or thermal cycling event in-use. The inclusion of the second source of inorganic particles in the cement composition according to aspects of the present disclosure allows for the use of low amounts and in some cases even the absence of the colloidal particles of the first source of inorganic particles, while still providing a cement skin having the desired characteristics, such as low cracking rates and/or a desired strength. Without being limited by any theory, it is believed that the inclusion of the second source of inorganic particles to replace some or all of the fine colloidal particles of the first source of inorganic particles decreases migration of the fine colloidal particles into the ceramic substrate, which may contribute to the cracking resistance, strength, and/or thermal stability of the cement skins of the present disclosure.

According to one aspect, the cement composition can include an inorganic fibrous material present at about ≤15% of the cement composition (by dry weight). The inorganic fibrous material can be any suitable inorganic fibrous material, non-limiting examples of which include an alkaline earth silicate fibrous material, wollastonite, and mullite. In some examples, when present, the inorganic fibrous material has an aspect ratio of longest axis to shortest axis of >5:1. In some aspects, the inorganic fibrous material is present at about ≤15%, ≤12%, ≤10%, ≤8%, ≤5%, or ≤3% of the cement composition (by dry weight). For example, the inorganic fibrous material can be present in an amount of from about 0% to about 15%, about 0% to about 12%, about 0% to about 10%, about 0% to about 8%, about 0% to about 5%, about 0% to about 3%, about 3% to about 15%, about 3% to about 12%, about 3% to about 10%, about 3% to about 8%, about 3% to about 5%, about 5% to about 15%, about 5% to about 12%, about 5% to about 10%, or about 5% to about 8% of the cement composition (by dry weight). In some examples, the inorganic fibrous material can be present in an amount of about 0%, about 3%, about 5%, about 6%, about 7%, about 8%, about 9%, about 10%, about 12%, or about 15% of the cement composition (by dry weight) or any amount between these values. An example of a suitable inorganic fibrous material is NYGLOS® 8, a wollastonite fiber available from NYCO Minerals, Inc.

In some examples, the cement composition is free of any added inorganic fibrous material. Inorganic fibrous material is typically added as a reinforcing material to help strengthen the cement skin. Without intending to be limited by any theory, it is believed that when the cement composition is free of inorganic fibrous material, the cement skin can still have sufficient strength due at least in part to the presence of the intermediate particles of the second source of inorganic particles. When the cement composition is free of inorganic fibrous material, the cement composition can include the first source of inorganic particles, as described above, which may provide an increase in the strength of the cement skin that offsets a loss of strength due to the absence of the inorganic fibrous material. When the cement composition is free of the first source of inorganic particles, the cement composition can include the inorganic fibrous material as described herein.

According to an aspect of the present disclosure, the cement composition can include a water-soluble organic binder. The water-soluble organic binder can include one or more organic materials, non-limiting examples of which include cellulose ether, methylcellulose, ethylcellulose, polyvinyl alcohol, polyethylene oxide, xanthum gum, latex, or combinations thereof. An example of a suitable commercially available water-soluble organic binder is A4M Methocel™, which is a water-soluble methyl cellulose polymer binder available from DuPont. The water-soluble organic binder can act as a rheology modifier when the composition is in a wet state and a binder in the dried state.

The amount of the water-soluble organic binder in the cement composition may be based at least in part on rheological and/or binding requirements. The water-soluble organic binder can be present in the cement composition in an amount of from about 0.1% to 5% (by dry weight). In some examples, the amount of water-soluble organic binder is from about 0.1% to about 5%, about 0.5% to about 5%, about 1% to about 5%, about 2% to 5%, about 0.1% to about 2%, about 0.5% to about 2%, about 1% to about 2%, about 0.1% to about 1%, or about 0.5% to about 1% (by dry weight). For example, the amount of water-soluble organic binder can be present in an amount of about 0.1%, about 0.5%, about 0.6%, about 0.7%, about 0.8%, about 0.9%, about 1%, about 2%, or about 5% (by dry weight), or any other amount between these values.

According to an aspect of the present disclosure, the cement composition can include a third source of inorganic particles. The third source of inorganic particles can also be referred to as an inorganic filler. The third source of inorganic particles can provide a source of inorganic particles that are predominately larger than the fine inorganic particles of the first source (when present) and the intermediate inorganic particles of the second source, and thus can also be referred to as large inorganic particles. The third source of inorganic particles can include particles having a diameter >1 micrometer ("µm"). In some aspects, the third source of inorganic particles includes particles having a diameter >1 µm, >10 µm, >50 µm, or >100 µm. In some aspects, the third source of inorganic particles includes particles having a diameter of from about 1 µm to about 300 µm, about 1 µm to about 200 µm, about 1 µm to about 100 µm, about 10 µm to about 300 µm, about 10 µm to about 200 µm, about 10 µm to about 100 µm, about 100 µm to about 300 µm, or about 100 µm to about 200 µm. The third source of inorganic particles can be any suitable type of large, inorganic filler material, non-limiting examples of which include amorphous fused silica, coarse glass powder, cordierite, aluminum titanate, alumina, silicon carbide, or combinations thereof. −80/+105 mesh: D1>125 microns, D 90<177 microns; −200 mesh: D90<74 microns Larger particles, such as those suitable for use as the third source of inorganic particles may be defined by a particle size that is based on the ability of the particles to pass through and/or be retained by a sieve having openings of a specified diameter, rather than a mean particle diameter defined by laser light scattering. These larger particles are often characterized based on a sieve mesh designation. U.S. standard sieve mesh sizes of 3.5 to 635 are typically designated by the number of openings per linear inch in the sieve. A "+" before the sieve mesh size indicates that 90% of the particles are retained by the sieve; a "−" before the sieve mesh size indicates that 90% of the particles pass through the sieve. In one example, the third source of inorganic particles can include −200 mesh inorganic particles. In another example, the third source of inorganic particles can include −80/+105 mesh inorganic particles. In another example, the third source of inorganic particles can include a combination of two or more sources of inorganic particles defined by different mesh sizes.

According to one aspect, the third source of inorganic particles can be present in an amount >50% of the cement composition (by dry weight). For example, the third source of inorganic particles can be present in an amount >50%, >60%, >70%, >80% of the cement composition (by dry weight). In some examples, the third source of inorganic particles can be present in an amount of from about 50% to about 90%, about 50% to about 85%, about 50% to about 80%, about 50% to about 75%, about 50% to about 70%, about 60% to about 90%, about 60% to about 85%, about 60% to about 80%, about 60% to about 75%, about 60% to about 70%, about 70% to about 90%, about 70% to about 85%, about 70% to about 80%, about 75% to about 90%, about 75% to about 85%, about 75% to about 80%, about 80% to about 90%, or about 80% to about 85% of the cement composition (by dry weight). For example, the third source of inorganic particles can be present in an amount of about 50%, about 60%, about 70%, about 75%, about 76%, about 77%, about 78%, about 80%, about 81%, about 82%, about 83%, about 84%, about 85%, about 86%, about 87%, about 88%, about 89%, about 90%, or any amount between these values (by dry weight).

According to an aspect of the present disclosure, the cement composition can include one or more additives or modifiers. In some aspects, the cement composition optionally includes a pH modifier. The pH modifier may facilitate dispersion of one or more of the first, second, and/or third sources of inorganic particles. Examples of suitable pH modifiers include sodium hydroxide and potassium hydroxide. The type and amount of pH modifier may vary based on components of the cement composition. In some examples, the amount of pH modifier can be from about 0.01 to about 0.3% of the cement composition (by dry weight).

In some aspects, the cement composition optionally includes a rheology modifier. Examples of a suitable rheology modifier include a smectic clay or a hydrated magnesium aluminum silicate clay. An example of a suitable rheology modifier includes Veegum®, from Vanderbilt Minerals, LLC.

While the cement composition is described in the context of being for use in forming a cement skin, such as the cement skin 30 of FIGS. 1-2, it is within the scope of the present disclosure for the cement compositions described herein to be used to form other structures, such as for forming plug structures in honeycomb bodies or for forming other coatings.

According to an aspect of the present disclosure, the present cement compositions can be used to form a cement skin. In one example, the cement skin can be prepared by first blending the dry components together. Optionally, the second source of inorganic particles can be added as a slurry containing a small amount of a pH modifier. The wet components and optionally additional water can be added to the dry components and mixed until homogenous. The cement composition can be applied to a ceramic substrate according to any suitable process, examples of which include extrusion, a doctor blade operation, an axial skinning operation, spray casting, or tape casting.

Exemplary cement compositions for forming a cement skin according to the present disclosure are listed below in Tables 1-3, identified as "Exemplary Cement Compositions A-C," respectively. Tables 1-3 identify the combination of materials and their respective amounts, in ranges, according to the present disclosure. The cement compositions of Tables 1-3 may include additional components according to aspects of the present disclosure discussed herein.

TABLE 1

Exemplary Cement Composition A

| Component | Amount range (by dry weight) |
|---|---|
| Fine inorganic particles (first source) | ≤15% |
| Intermediate inorganic particles (second source) | ~5% to ~15% |
| Inorganic fibrous material | 0% (i.e., free of inorganic fibrous material) |
| Water-soluble organic binder | ~0.1% to ~5% |
| Large inorganic particles (third source) | >50% |

TABLE 2

Exemplary Cement Composition B

| Component | Amount range (by dry weight) |
|---|---|
| Fine inorganic particles (first source) | 0% (i.e., free of fine inorganic particles) |
| Intermediate inorganic particles (second source) | ~5% to ~15% |
| Inorganic fibrous material | ≤15% |
| Water-soluble organic binder | ~0.1% to ~5% |
| Large inorganic particles (third source) | >50% |

TABLE 3

Exemplary Cement Composition C

| Component | Amount range (by dry weight) |
|---|---|
| Fine inorganic particles (first source) | ≤15% |
| Intermediate inorganic particles (second source) | ~5% to ~15% |
| Inorganic fibrous material | ≤15% |
| Water-soluble organic binder | ~0.1% to ~5% |
| Large inorganic particles (third source) | >50% |

The cement skins of the present disclosure may be derived from the cement compositions of Tables 1-3, as described above, and formed by any suitable method for forming a cement skin on a ceramic structure or honeycomb body.

The cement skin formed using the cement composition of the present disclosure can have an average maximum thermal shock limit temperature before cracking of at least about 400° C. In some aspects, the average maximum thermal shock limit temperature before cracking is at least about 400° C., at least about 500° C., at least about 600° C., at least about 700° C., at least about 800° C., at least about 900° C., at least about 1000° C. The average maximum thermal shock limit temperature can be used as an indication of the thermal shock resistance of the cement skin to temperature changes that can occur during many end-use applications, such as diesel engine applications.

As used therein, the average maximum thermal shock limit temperature is measured for a cement skin having a thickness of from about 1 mm to 2 mm on a cellular cordierite ceramic substrate. The cellular cordierite ceramic substrate can be a honeycomb body ("test honeycomb body") having a length of about 150 mm or a flat cordierite ceramic honeycomb coupon ("coupon") that has an area of about 150 mm$^2$ and is about 4-6 cells thick. The ceramic substrate and applied cement skin are dried at temperatures of from about 70° C. to about 90° C., without humidity control, to form the test articles. The test articles are then loaded onto a stage of a bottom-loading furnace and raised into the furnace hot zone at 500° C. The test articles are allowed to equilibrate for about 2-3 hours. The furnace stage is then lowered to quickly cool the test articles. The rate of cooling is accelerated by a fan that actively circulates ambient air over exterior portions of the test articles. After cooling, the test articles are inspected and deemed to have failed if a crack is present in the cement skin based on visual inspection with a 10× magnification loupe. The heating and cooling process is repeated 3 times; if the test article survives the heating and cooling process 3 times (i.e., no cracks are visible in the cement skin), then the temperature in the hot zone is increased by 50° C. and the heating and cooling process is repeated. This process is repeated until either the test article fails or the test temperature in the hot zone has reached 1000° C. The cracking rate after drying of the cement skin can be determined by visual inspection with a 10× magnification loupe.

The cement skin formed using the cement composition of the present disclosure can have a strength that is defined according to a nut-pull strength test ("nut-pull strength"). As used herein, the nut-pull strength is determined by gluing a 0.63 cm nut to the cement skin of a test article and using the nut as an anchor point to secure a cable. Tension is incrementally increased on the cable until the attached cement skin is separated from the underlying ceramic substrate. The test articles are prepared by applying an approximately 1-2 mm thick cement skin to either a cordierite ceramic honeycomb body (test honeycomb body) having a length of about 150 mm or a flat cordierite ceramic honeycomb coupon (coupon) that has an area of about 150 mm$^2$ and is about 4-6 cells thick. The applied cement skin is dried at temperatures of from about 70° C. to about 90° C., without humidity control, and then heated to 600° C. prior to testing. The nut-pull strength test is conducted on articles at room temperature after drying ("as-dried") and after heating to 600° C. ("after heating"). Heating to 600° C. generally results in removal of the organic binder from the cement skin (due to pyrolysis).

In some aspects, cement skins formed from the cement composition of the present disclosure can have an as-dried nut-pull strength of at least 7 pound force ("lbf"), as measured on test honeycomb body and/or a coupon. For example, the cement skins of the present disclosure can have an as-dried nut-pull strength of at least about 7 lbf, at least about 8 lbf, at least about 9 lbf, or at least about 10 lbf, as measured on test honeycomb body and/or a coupon. In some examples, the cement skins of the present disclosure can have an as-dried nut-pull strength of from about 7 lbf to about 20 lbf, about 7 lbf to about 15 lbf, about 7 lbf to about 10 lbf, about 8 lbf to about 20 lbf, about 8 lbf to about 15 lbf, about 8 lbf to about 10 lbf, about 10 lbf to about 20 lbf, or about 10 lbf to about 15 lbf, as measured on test honeycomb body and/or a coupon.

In some aspects, cement skins formed from the cement compositions of the present disclosure can have an after heating (600° C.) nut-pull strength of at least 4 pound force ("lbf"), as measured on a test honeycomb body and/or a coupon. For example, the cement skins of the present disclosure can have an after heating (600° C.) nut-pull strength of at least about 4 lbf, at least about 5 lbf, at least about 6 lbf, or at least about 7 lbf, as measured on test honeycomb body and/or a coupon. In some examples, the cement skins of the present disclosure can have an after heating (600° C.) nut-pull strength of from about 4 lbf to about 10 lbf, about 4 lbf to about 8 lbf, about 5 lbf to about 10 lbf, or about 5 lbf to about 8 lbf, as measured on test honeycomb body and/or a coupon.

According to an aspect of the present disclosure, cement skins made from the presently disclosed cement compositions can have a mismatch strain between the cement skin and the underlying ceramic substrate. The likelihood of crack formation occurring in an applied cement skin typically increases as the tensile mismatch strain between the cement skin and the ceramic substrate increases. Without wishing to be limited by theory, it is believed that compressive mismatch strain may be protective against cracking, i.e., a cement skin may be less likely to crack when under compressive strain compared to when experiencing tensile strain. The mismatch strain between the cement skin and the ceramic substrate can be influenced by a number of factors, non-limiting examples of which include the cement skin drying process, the thermal history of the cement skin, dimensional changes of the cement skin as a result of pyrolysis of organic material and/or sintering of colloidal particles, thermal shock (use conditions), and thermal expansion of the ceramic substrate. Generally, as the applied cement skin composition dries the cement skin is expected to shrink, which results in a residual tension between cement skin and the ceramic substrate. The porosity of the ceramic substrate can also effect the residual tension in the cement skin upon drying. Porous microstructure in the ceramic substrate can exert capillary forces on liquids in the applied wet cement composition, affecting the drying process and the resulting residual tension when dried. The microstructure within the skin can affect the manner in which particles within the cement skin rearrange and move toward drying fronts during the drying process, which can also affect the residual tension in the cement skin when dried. In addition, the mismatch strain between the cement skin and the ceramic substrate can exert a force on the cement skin that influences dimensional changes in the cement skin based on thermal history.

The mismatch strain $\Delta\varepsilon$ of a cement skin to a cellular ceramic substrate, as discussed herein, can be determined based upon changes in curvature $\Delta\kappa$ of a bilayer. The curvature of a bilayer of cement skin on a cellular ceramic substrate due to a mismatch strain from curvature theory is given according to formula (1):

$$\kappa = \frac{6h_m h_s (h_m + h_s) E_m E_s}{E_m^2 h_m^4 + 4E_m h_m^3 h_s E_s + 6E_m h_m^2 h_s^2 E_s + 4E_m h_m h_s^3 E_s + h_s^4 E_s^2} \Delta\varepsilon \quad (1)$$

wherein $E_m$ is an elastic modulus of the cellular ceramic in the bilayer, $E_s$ is an elastic modulus of the skin, $h_m$ is a thickness of the cellular ceramic in the bilayer, and $h_s$ is a thickness of the cement skin. In this scenario, the curvature is defined relative to the independent cement layers in the unstressed state. The mismatch strain $\Delta\varepsilon$ is based on proportionality of curvature $\kappa$ of a bilayer due to a mismatch strain between the layers, expressed by formula (1). Because the elastic properties and respective thickness of the cement skin and the ceramic substrate can be determined, the mismatch strain $\Delta\varepsilon$ can be obtained by measuring curvature or changes in curvature of the article. A negative curvature indicates that the cement skin is in a state of tension. The method defines the mismatch strain $\Delta\varepsilon$ with respect to the ceramic substrate as the reference, according to formula (2):

$$\Delta\varepsilon = \frac{l_s - l_m}{l_m} \quad (2)$$

where $l_s$ and $l_m$ represent the lengths of the cement skin and ceramic substrate in the unconstrained state, respectively. It is understood that $l_s$ and $l_m$ are temperature dependent and that $l_s$ is influenced by drying conditions and thermal history.

The elastic modulus $E_m$ of the cellular ceramic substrate is determined either at room temperature using impulse excitation or as a function of temperature using sonic resonance according to ASTM 1198-09 "Standard Test Method for Dynamic Young's Modulus, Shear Modulus, and Poisson's Ratio for Advanced Ceramics by Sonic Resonance," re-approved 2013. The elastic modulus $E_w$ of the non-cellular material that forms the walls of the ceramic substrate can be determined as described in J. Webb, S. Widjaja, and J. Helfinstine, "Strength Size Effects in Cellular Ceramic Structures," *Ceramic Engineering and Science Proceedings—Mechanical Properties and Performance of Engineering Ceramics II*, Vol. 27, Issue 2, 521-531 (2006), which is incorporated herein by reference in its entirety. The elastic modulus of the cement skin $E_s$ can be determined either at room temperature using impulse excitation or as a function of temperature using sonic resonance according to the ASTM 1198-09 standard using a bilayer sample that consists of the cement skin attached to a single wall of the cellular ceramic substrate. The elastic modulus $E_s$ of the cement skin can be defined according to formula (3):

$$E_s = \frac{1}{2h_s^3}\Big(E_c(h_w + h_s)^3 - E_w h_w(4h_w^2 + 6h_w h_s + 4h_s^2) + (h_w + h_s) \times \sqrt{(E_c(h_w + h_s)^4) + 16E_w^2 h_w^2(h_w^2 + h_w h_s + h_s^2) - 4E_c E_w h_w(2h_w^3 + 5h_w^2 h_s + 4h_w h_s^2 + h_s^3)}\Big) \quad (3)$$

where $h_w$ is the thickness of the walls of the ceramic substrate.

The elastic modulus is measured by taking a sample along an axial cross-section of the test article that is approximately 12 mm thick by 24 mm wide and about 100 mm to 150 mm in length, in a region adjacent to the cement skin. For a ceramic honeycomb, the samples are taken from a radial position of about 90 degrees (or some multiple of 90 degrees) with respect to the longitudinal axis of the ceramic honeycomb. The 90 degree positions are chosen for testing because samples are generally flat over a distance of about 8 mm to about 20 mm and about 70 mm to about 150 mm in length. The sample is cut such that a ceramic wall extends along at least a majority of the length of the substrate and is in contact with the cement skin. The ceramic walls connecting the honeycomb to the cement skin are cut and the elastic modulus $E_c$ of the composite piece of skin and remaining piece of attached ceramic wall is measured. The elastic modulus $E_s$ of the skin is determined by accounting for its contribution to the elastic modulus $E_c$ of the composite according to formula (3).

As used herein, the mismatch strain between the cement skin and the cellular ceramic substrate can be separated into two components, a mismatch strain on drying, $\Delta\varepsilon_{dry}$, and a change in mismatch strain resulting from subsequent exposures to elevated temperatures after drying, $\Delta\varepsilon_T$. Hence, the total mismatch strain is $\Delta\varepsilon_{Total}=\Delta\varepsilon_{dry}+\Delta\varepsilon_T$. It is understood that these mismatch strains depend on materials, process conditions, and process history. It is further understood that formula (1) applies with substitution mismatch strain on drying, $\Delta\varepsilon_{dry}$, for $\Delta\varepsilon$. It is yet further understood that the change in mismatch strain after drying and with temperature, $\Delta\varepsilon_T$, substitutes for $\Delta\varepsilon$ in formula (1) and is proportional to the changes in curvature after drying.

Figure 3B:
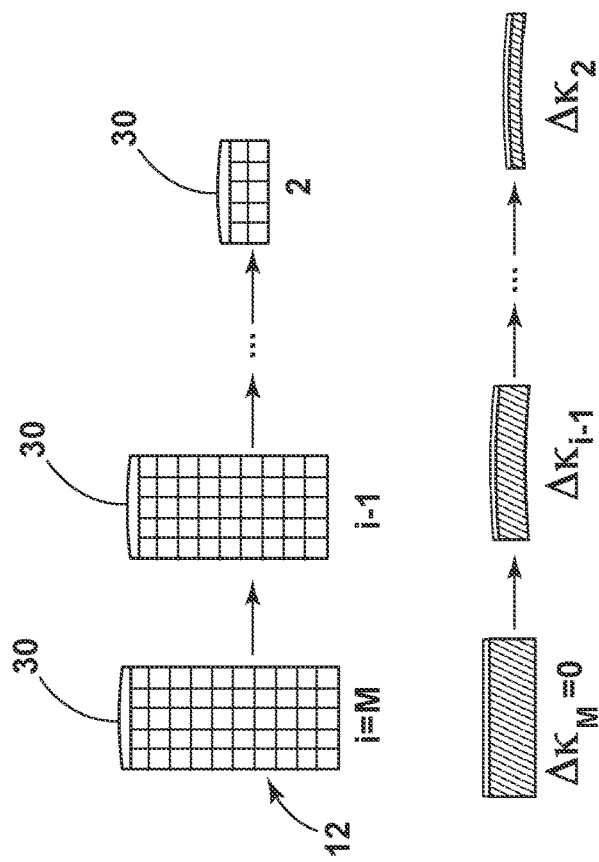
FIG. 3B is a schematic illustration of a method of determining a change in curvature from a bilayer sample of cement skin on a cellular ceramic substrate, according to an aspect of the present disclosure.
Figure 3A:
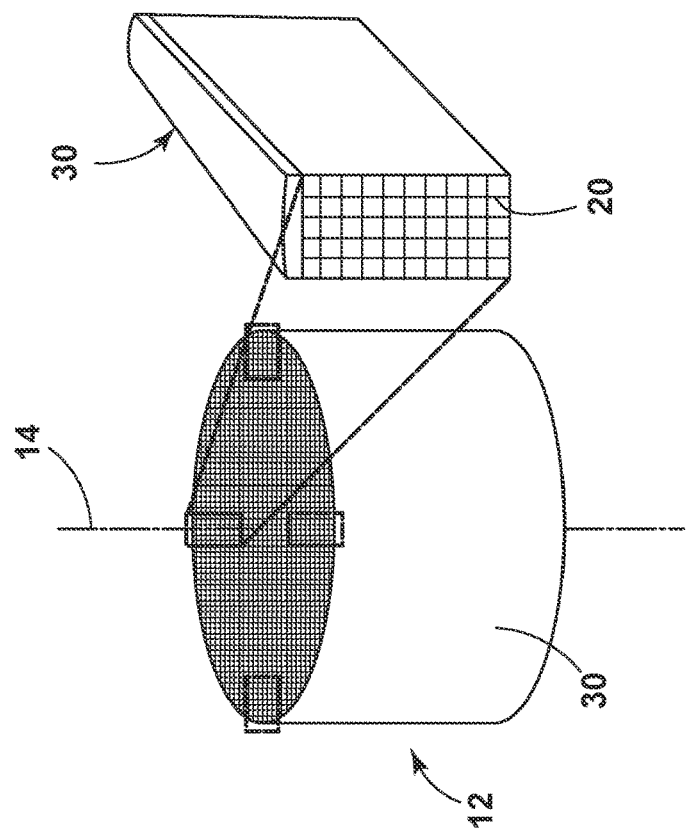
FIG. 3A is a schematic illustration of sample locations and curvature sample geometry for analysis of a cement skin applied to a honeycomb structure, according to an aspect of the present disclosure.

Referring now to FIGS. 3A-3B, the mismatch strain between the as-dried cement skin 30 and the ceramic substrate (e.g., honeycomb body 12), $\Delta\varepsilon_{dry}$, is determined by measuring changes in curvature $\Delta\kappa$ of the cement skin 30 as the underlying ceramic substrate is removed, which results in a release of residual stress from the cement skin 30. Referring to FIG. 3A, to determine the mismatch strain after drying $\Delta\varepsilon_{dry}$, a sample is extracted from a radial position of about 90 degrees (or some multiple of 90 degrees) with respect to the longitudinal axis 14 of the ceramic honeycomb body 12 (dashed rectangles). The sample was approximately 8 mm to 20 mm width and up about 25 mm thick.

A laser scan profile of the cement skin 30 of the sample as shown in FIG. 3A is obtained along a length of the sample as a reference profile. As illustrated schematically in FIG. 3B, rows of the attached cellular ceramic material are then trimmed away one row at a time. A laser scan profile of the cement skin 30 is obtained after each row is removed and a change in curvature Δκ of the sample compared to the reference profile is determined. The trimming process is repeated row by row until about 2-5 rows remain. The process of trimming away the rows of cells results in a set of changes in curvature Δκ of the cement skin 30 if a mismatch strain is present between the cement skin 30 and the honeycomb body 12. In the examples provided herein, the laser scan profile was obtained using a Keyence LK-G32 laser mounted to a programmable, motion-controlled stage. The mismatch strain after drying $\Delta\varepsilon_{dry}$ between the as-dried cement skin and the ceramic substrate is obtained by a least-squares regression fitting of the set of measured changes in curvature Δκ of the cement skin and estimated changes in curvature Δκ using formula (1), the material thicknesses, and the elastic moduli of each material, determined as described above. It is understood that room temperature values of the elastic moduli of the cement skin and the material forming the walls of the ceramic substrate, $E_s$ and $E_w$, respectively, are used to determine the mismatch strain after drying $\Delta\varepsilon_{dry}$.

Figure 4:
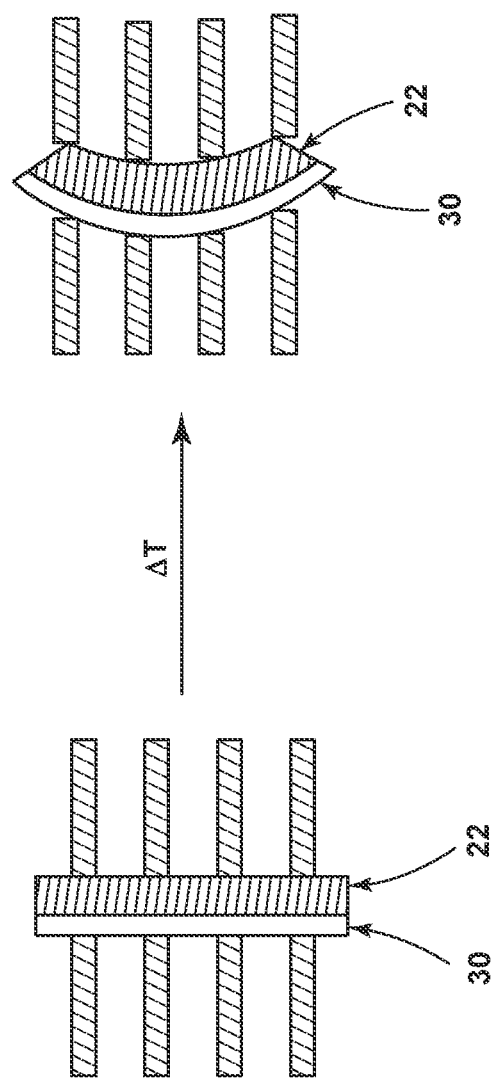
FIG. 4 is a schematic illustration of a method of determining the effects of temperature on a change in curvature of a cement skin, according to an aspect of the present disclosure.

Referring now to FIG. 4, the sample of the cement skin on the ceramic substrate that remains after determining the change in curvature Δκ of the cement skin 30 as the rows of cells 22 are trimmed away can also be analyzed to determine changes in curvature Δκ of the cement skin 30 as a function of temperature. The changes in curvature Δκ as a function of temperature are measured relative to the as-dried state of the sample. Changes in curvature Δκ of the cement skin sample based on changes in temperature were determined using a dilatometer system that includes a furnace and four pairs of opposing push-rod dilatometers, illustrated schematically in FIG. 4. The pairs of dilatometers were spaced at intervals of about 15 mm to 30 mm. Changes in curvature Δκ of the cement skin 30 at different temperatures can be determined based on changes in position of each dilatometer. The dilatometer system of the present disclosure can be used to determine the mismatch strain $\Delta\varepsilon_T$ after a heat treatment process. It is understood that the elastic moduli used to relate the changes in curvature with temperature to the change in mismatch strain with temperature are also determined as a function of temperature. The total mismatch strain $\Delta\varepsilon_{Total}$ after drying and through subsequent exposure to elevated temperatures, both heating and cooling, is obtained by a summation of the mismatch strain after drying $\Delta\varepsilon_{dry}$ and the change in mismatch strain based upon temperature $\Delta\varepsilon_T$.

According to an aspect of the present disclosure, the cement skins of the present disclosure can have a total mismatch strain $\Delta\varepsilon_{Total}$ between the cement skin and a ceramic substrate that is greater than 50 ppm, as measured at 800° C. based on a determination of $\Delta\varepsilon_{dry}$ and $\Delta\varepsilon_T$. When determining the change in mismatch strain with temperature, the cement skin sample is heated at a heating rate of about 2° C./minute to 400° C., held for 15 minutes, then cooled to 50° C. The cement skin is then heated to 600° C. at the same rate, held for 15 minutes, then cooled to 50° C. The process is repeated for heating to 800° C. and then 1000° C.

In some aspects, the total mismatch strain $\Delta\varepsilon_{Total}$ between the cement skin and the ceramic substrate is greater than 50 ppm, greater than 100 ppm, greater than 200 ppm, or greater than 300 ppm, as measured at 800° C. For example, the total mismatch strain $\Delta\varepsilon_{Total}$ can be from about 50 ppm to about 500 ppm, about 50 ppm to about 400 ppm, about 50 ppm to about 300 ppm, about 50 ppm to about 200 ppm, about 100 ppm to about 500 ppm, about 100 ppm to about 400 ppm, about 100 ppm to about 300 ppm, about 100 ppm to about 200 ppm, about 200 ppm to about 500 ppm, about 200 ppm to about 400 ppm, about 200 ppm to about 300 ppm, about 300 ppm to about 500 ppm, or about 300 ppm to about 400 ppm, as measured at 800° C. In some examples, the total mismatch strain $\Delta\varepsilon_{Total}$ is about 50 ppm, about 100 ppm, about 148 ppm, about 150 ppm, about 200 ppm, about 250 ppm, about 300 ppm, about 339 ppm, about 340 ppm, about 350 ppm, about 397 ppm, about 400 ppm, about 450 ppm, about 500 ppm, or any strain value between these values as measured at 800° C.

According to some aspects of the present disclosure, the cement skins of the present disclosure can have a mismatch strain $\Delta\varepsilon_{dry}$ between the cement skin and a ceramic substrate, as measured at 25° C. after drying of the cement skin that is greater than −120 pm. The mismatch strain is determined based on a honeycomb structure that is dried at temperatures of from about 70° C. to about 90° C., without humidity control. In some aspects, the mismatch strain $\Delta\varepsilon_{dry}$ between the cement skin and the ceramic substrate, as measured at 25° C. after drying of the cement skin, is from about −120 ppm to about 0 ppm, about −110 ppm to about 0 ppm, or about −100 ppm to about 0 ppm.

According to some aspects of the present disclosure, a total mismatch strain $\Delta\varepsilon_{Total}$ between the cement skin and a ceramic substrate, as measured at 25° C. after heating to a temperature of between 400° C. and 800° C., is increased by at least 10 ppm compared to the mismatch strain immediately after drying $\Delta\varepsilon_{dry}$, as measured at 25° C. The mismatch strain is determined based on a honeycomb structure that is dried at temperatures of from about 70° C. to about 90° C., without humidity control. The as-dried cement skin can be heated to 400° C. and then the total mismatch strain $\Delta\varepsilon_{Total}$ can be measured after the sample has cooled to about 25° C. (room temperature). The cement skin can be heated to 600° C., 800° C., and 1000° C. and the total mismatch strain $\Delta\varepsilon_{Total}$ can be determined following each heat treatment after the sample has cooled to about 25° C. According to one aspect, the cement skins of the present disclosure have a total mismatch strain $\Delta\varepsilon_{Total}$ at 25° C. that increases after heating to a temperature of from about 400° C. to about 800° C. compared to the as-dried mismatch strain $\Delta\varepsilon_{dry}$ at 25° C. In some aspects, the total mismatch strain $\Delta\varepsilon_{Total}$ at 25° C. increases by at least about 10 ppm after heating to a temperature of from about 400° C. to about 800° C. compared to the as-dried mismatch strain $\Delta\varepsilon_{dry}$ at 25° C. In some aspects, the cement skin has a total mismatch strain $\Delta\varepsilon_{Total}$ at 25° C. that becomes compressive (i.e., >0) after heating to a temperature of from about 400° C. to about 800° C.

EXAMPLES

The following examples describe various features and advantages provided by the disclosure and are in no way intended to limit aspects of the disclosure disclosed herein or the appended claims.

Example 1

Tables 4 and 5 below include exemplary Example Cement Compositions 1A-1E ("Ex. 1A-1E") according to the present disclosure and a HFS Example Cement Composition 1A ("HFS. Ex. 1A") based on percent by weight (wt %) of the composition (Table 4) and percent by dry weight (% dry) of the composition (Table 5).

TABLE 4

Low Fines Cement Compositions 1A-1E and HFS Example 1A

| Material | Component | HFS Ex. 1A (wt %) | Ex. 1A (wt %) | Ex. 1B (wt %) | Ex. 1C (wt %) | Ex. 1D (wt %) | Ex. 1E (wt %) |
|---|---|---|---|---|---|---|---|
| Ludox ® HS40 colloidal silica | Fine inorganic particles | 21.03 | 4.48 | 4.25 | 4.11 | — | 4.21 |
| Silica soot | Intermediate inorganic particles | — | 8.97 | 8.5 | 8.22 | 8.24 | 8.42 |
| Fused silica, −200 mesh | Large inorganic particles | 30.04 | 21.25 | 20.03 | 32.29 | 29.43 | 30.08 |
| Fused silica, −80/+105 mesh | Large inorganic particles | 30.04 | 49.33 | 46.75 | 32.29 | 29.43 | 30.08 |
| NYGLOS ® 8 (wollastonite) | Inorganic fibrous material | 6.01 | — | — | — | 5.89 | 6.02 |
| A4M Methocel ™ | Organic binder | 0.66 | 0.7 | 0.67 | 0.65 | 0.65 | 0.66 |
| NaOH | pH modifier | — | 0.09 | 0.09 | 0.08 | 0.08 | 0.08 |
| Veegum ® | Rheology modifier | 0.33 | — | 0.33 | 0.32 | 0.32 | 0.33 |
| Water | Solvent | 11.9 | 15.18 | 19.38 | 22.05 | 25.96 | 20.12 |

TABLE 5

Low Fines Cement Compositions 1A-1E and HFS Example 1A (by dry weight)

| Material | Component | HFS Ex. 1A (% dry) | Ex. 1A (% dry) | Ex. 1B (% dry) | Ex. 1C (% dry) | Ex. 1D (% dry) | Ex. 1E (% dry) |
|---|---|---|---|---|---|---|---|
| Ludox ® HS40 colloidal silica | Fine inorganic particles | 11.14 | 2.18 | 2.18 | 2.18 | — | 2.18 |
| Silica soot | Intermediate inorganic particles | — | 10.92 | 10.89 | 10.89 | 11.13 | 10.89 |
| Fused silica, −200 mesh | Large inorganic particles | 39.79 | 25.87 | 25.66 | 42.77 | 39.75 | 38.88 |
| Fused silica, −80/+105 mesh | Large inorganic particles | 39.79 | 60.06 | 59.88 | 42.77 | 39.75 | 38.88 |
| NYGLOS ® 8 (wollastonite) | Inorganic fibrous material | 7.96 | — | — | — | 7.95 | 7.78 |
| A4M Methocel ™ | Organic binder | 0.88 | 0.86 | 0.86 | 0.86 | 0.87 | 0.86 |
| NaOH | pH modifier | — | 0.11 | 0.11 | 0.11 | 0.11 | 0.11 |
| Veegum ® | Rheology modifier | 0.44 | — | 0.43 | 0.43 | 0.44 | 0.43 |

Figure 5B:
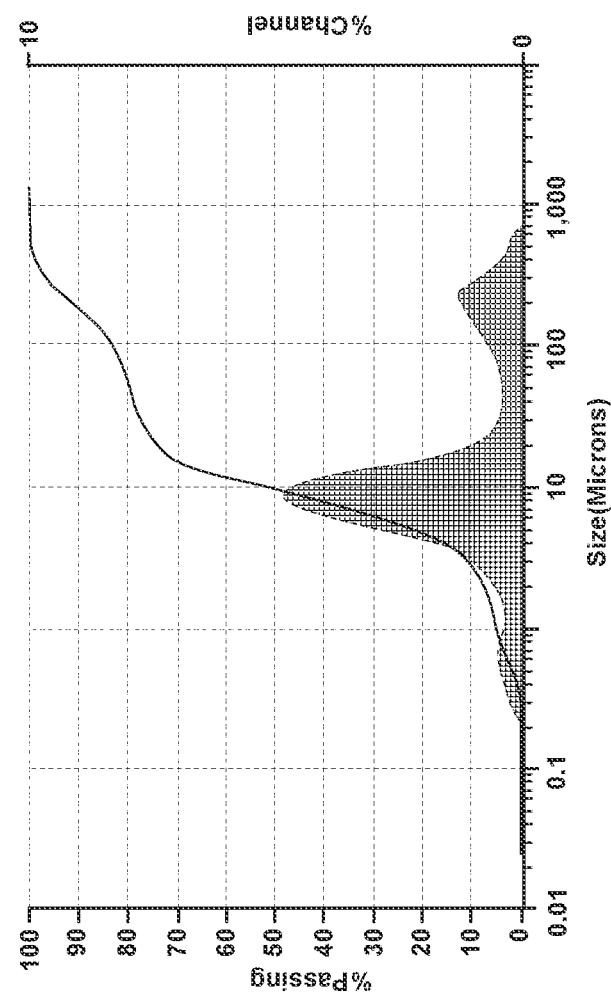
FIG. 5B is a particle size distribution of the silica soot sample of FIG. 5A determined using laser light scattering, according to an aspect of the present disclosure.
Figure 5A:
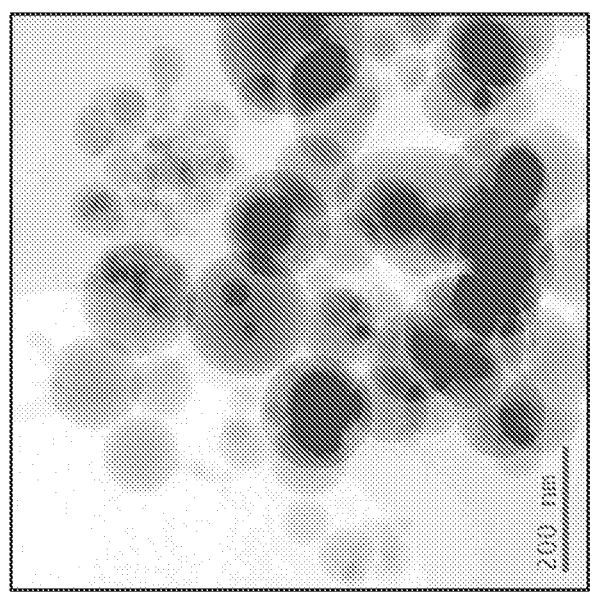
FIG. 5A is transmission electron microscope (TEM) micrograph of a silica soot sample, according to an aspect of the present disclosure.

Referring to FIGS. 5A-5B, the silica soot particles used in Example Cement Compositions 1A-1E were produced from a flame hydrolysis process. The silica soot particles include nanoparticles having diameters in the range of about 2 nm to about 300 nm, with a mean diameter of about 200 nm, as shown in FIG. 5A. As illustrated in FIG. 5B, the silica soot particles form agglomerates having a bimodal size distribution, as determined using laser light scattering. These agglomerates are generally dispersed during the mixing process of preparing the wet cement skin for application to a substrate.

Example 2

The Example Cement Compositions 1A-1E and HFS Example Cement Composition 1A of Example 1 above were used to prepare cement skins on ceramic cordierite honeycomb bodies. Exemplary Honeycomb Samples 2A-2E ("Ex. 2A-2E") and HFS Honeycomb Sample 2A ("HFS. Ex. 2") were prepared using Example Cement Compositions 1A-1E and HFS Example Cement Composition 1A as shown in Table 6 below.

Ex. 2A-2E and HFS Ex. 2 were prepared using a ceramic cordierite honeycomb body that was formed in a conventional manner. The cement skins for Ex. 2A-2E and HFS Ex. 2A were applied to the honeycomb body and dried at the conditions indicated in Table 6. The cement skin compositions were prepared by first blending the dry components. For the cement skins of Ex. 2A-2E, the silica soot particles were added as a slurry that included the sodium hydroxide to aid in dispersion (e.g., breaking up soot particle agglomerates). The wet cement skin compositions were mixed for approximately 15 minutes with water added to provide a homogenous consistency. The honeycomb body was a cylindrically shaped cellular ceramic having a length of about 150 mm that was ground on a lathe to a uniform diameter. The cement skin compositions were applied to the honeycomb body at an average thickness of about 1 mm to about 2 mm. The cement skin compositions were dried as indicated in Table 6 below and the cracking rate, thermal shock limit, and nut-pull force was determined for each example and HFS sample. HFS Examples 2A(1), 2A(2), and 2A(3) were prepared in a similar manner using HFS Cement Composition 1A, except for the drying conditions, as indicated in Table 6. Examples 2A(1) and 2A(2) were prepared in a similar manner using Example Cement Composition 1A, except for the drying conditions, as indicated in Table 6. Except for HFS Ex. 2A(1), the remaining examples and HFS examples in Table 6 were dried without humidity control.

TABLE 6

Low Fines Ex. 2A-2E and HFS Ex. 2A Cracking Rate, Thermal Shock Limit, & Nut-Pull Strength

|  | HFS Ex. 2A(1) | HFS Ex. 2A(2) | HFS Ex. 2A(3) | Ex. 2A(1) | Ex. 2A(2) | Ex. 2B | Ex. 2C | Ex. 2D | Ex. 2E |
|---|---|---|---|---|---|---|---|---|---|
| Substrate diameter (mm) | 330 | 303 | 303 | 303 | 303 | 267 | 267 | 144 | 144 |
| Cell Density (per cm$^2$) | 62 | 62 | 62 | 62 | 62 | 62 | 62 | 93 | 93 |
| Wall thickness (μm) | 125 | 125 | 125 | 125 | 125 | 125 | 125 | 100 | 100 |
| Cement Composition | HFS Ex. 1A | HFS Ex. 1A | HFS Ex. 1A | Ex. 1A | Ex. 1A | Ex. 1B | Ex. 1C | Ex. 1D | Ex. 1E |
| Drying Condition (° C.) | 43 | 71 | 88 | 88 | 71 | 90 | 90 | 70-90 | 70-90 |
| Cracking Rate | Repair | 25/25 | 25/25 | 0/26 | 0/23 | 0/4 | 1/4 | 1/6 | 4/15 |
| Thermal Shock Limit (° C.) | 800 | N/A | N/A | >1000 | >1000 | 775 | 875 | 500 | 488 |
| Nut-pull force (lbf): as-dried | 6.0 | N/A | N/A | 8.1 | 8.5 | N/A | N/A | 13.6 | N/A |
| Nut-pull fore (lbf): after 600° C. | 5.1 | N/A | N/A | 4.7 | 5.1 | N/A | N/A | N/A | N/A |

*with humicity control,
N/A: not measured.

Figure 6C:
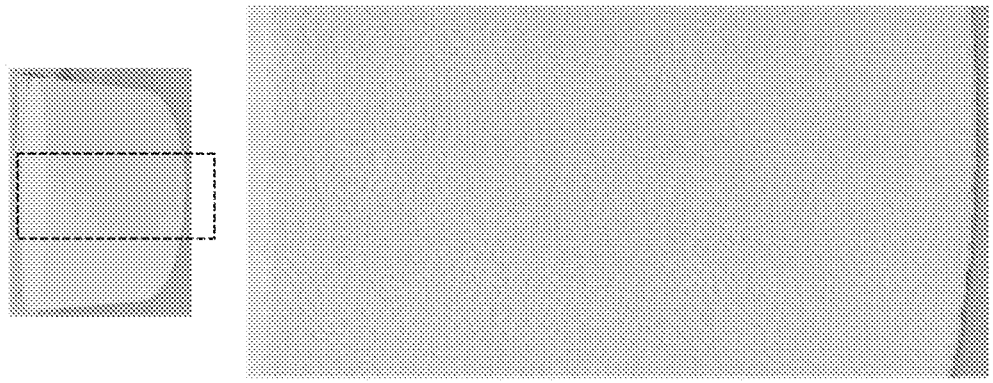
FIG. 6C is a photograph of a ceramic honeycomb structure and an enlarged view of a portion of an exterior of the ceramic honeycomb structure having a cement skin according to an aspect of the present disclosure.
Figure 6B:
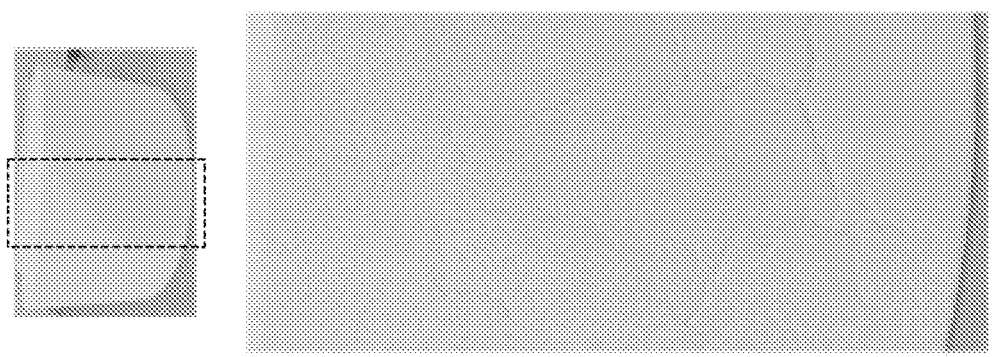
FIG. 6B is a photograph of a ceramic honeycomb structure and an enlarged view of a portion of an exterior of the ceramic honeycomb structure having a HFS cement skin.
Figure 6A:
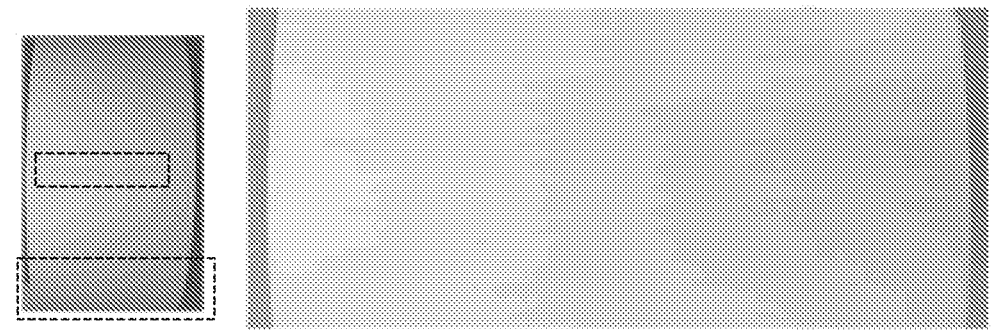
FIG. 6A is a photograph of a ceramic honeycomb structure and an enlarged view of a portion of an exterior of the ceramic honeycomb structure having a high fine silica content (HFS) cement skin.

The cracking rate of the example and HFS cement skins can be determined as described above based on visual inspection with a 10× magnification loupe. HFS Ex. 2A(1), which included a cement skin made using HFS Ex. 1A was dried at 43° C. with humidity control, resulting in some minor cracks that could be repaired manually as part of a conventional manufacturing process. Cement skins made using HFS Ex. 1A that were dried without humidity control exhibit significant cracking. In contrast, exemplary cement skins Ex. 2A-2E exhibited lower cracking rates and in many cases showed no cracking (Ex. 2A and 2B). The maximum cracking rate observed for the exemplary cement skins was 27% (Ex. 2E). FIGS. 6A-6C illustrate images of the surface of a cement skin for a sample of HFS Ex. 2A(1) dried with humidity control (FIG. 6A) and without humidity control (FIG. 6B) and for a sample of Ex. 2A(1) (FIG. 6C). The upper image in FIGS. 6A-6C shows the location on the honeycomb structure of the enlarged portion shown in the corresponding lower image. The smaller box in the upper portion of FIG. 6A highlights cracks that are visible in the cement skin of HFS Ex. 2A(1) dried with humidity control. FIG. 6B shows multiple cracks in the cement skin of HFS Ex. 2 dried without humidity control. The data in Table 6 and FIGS. 6A-6C demonstrates the ability of the cement skins of the present disclosure to have a lower incidence of cracking than a HFS cement skin, even when dried without humidity control. Drying without humidity control can result in benefits in production efficiency and/or costs.

The data in Table 6 also illustrates the strength of the cement skins of the present disclosure, as measured using nut-pull force. The nut-pull force for each example and HFS example was determined as described above at 25° C. after drying (as-dried) and at 25° C. after heating the dried samples to 600° C. ("after 600° C."). Ex. 2A and 2D exhibit cement skin strengths that are similar to or better than that exhibited by the HFS cement skin of HFS Ex. 2A. Ex. 2A illustrates that the cement skins of the present disclosure can have a similar or improved nut-pull strength (as-dried and after 600° C.) in the absence of inorganic fibrous material compared to the HFS cement skin sample of HFS Ex. 2A. Without wishing to be bound by any particular theory, it is believed that the presence of the intermediate inorganic particles allows for the cement skins of the present disclosure to have a similar or improved strength with a lower concentration of fine inorganic particles, which can result in a suppression of undesirable interactions between the organic binder and the fine inorganic particles. In some cases, the presence of the intermediate inorganic particles allows for the cement skins of the present disclosure to have a similar or improved strength in the absence of inorganic fibrous material compared to HFS cement skins that include inorganic fibrous material.

The average maximum thermal shock limit temperature of the cement skin can be used to assess the thermal shock resistance of the cement skin. The average maximum thermal shock limit temperature of the cement skin was determined as described above. The values listed in Table 6 for the thermal shock limit are the average last temperature before the appearance of a crack in the cement skin. A minimum of two parts were tested for each cement skin composition. The cement skins of Ex. 2A(1) and 2A(2) were able to survive the test process without cracking up to 1000° C., which is at least 200° C. higher than the HFS Ex. 2A(1). Ex. 2B and 2C exhibited similar or higher thermal shock limit temperatures compared to HFS Ex. 2A(1). Ex. 2A, which does not include inorganic fibrous material in the cement skin exhibited similar or improved strength and thermal shock resistance compared to the HFS example HFS Ex. 2A. Without being limited by any particular theory, it is believed that the absence of inorganic fibrous material contributes to the improvement in thermal shock resistance of the present cement skin compositions. It would generally be expected that the absence of inorganic fibrous material would result in a decrease in strength of the cement skin. However, Ex. 2A illustrates the ability of the present cement skin compositions, which include the intermediate inorganic particles in combination with little to no fine inorganic particles, to provide a cement skin having sufficient strength in the absence of inorganic fibrous material, which may contribute to the improvement in thermal shock resistance of the present cement skins.

Table 7 below summarizes characteristics of the cement skin and honeycomb body of the exemplary and HFS samples of Table 6 as a function of temperature. Porosity and mean pore diameter of the honeycomb ceramic substrates were characterized using a Micromeritics Autopore 1V 9520 Mercury Porosimeter. The thermal expansion of the substrates was determined using a push-rod dilatometer such as produced by Netzsch-Gerätebau GmbH.

TABLE 7

Characteristics of Low Fines Examples and HFS Samples Based on Temperature

| | | | HFS Ex. 2A(1) | Ex. 2A(1) | Ex. 2A(2) | Ex. 2D | Ex. 2E |
|---|---|---|---|---|---|---|---|
| Skin | Skin Thickness (mm) | | 1.53 | 2.03 | 1.61 | 1.71 | 1.73 |
| | Thickness of wall on skin (μm) | | 129 | 124 | 124 | 100.28 | 100.28 |
| | Young's Modulus after exposure to X ° C. (ppm) | 25° C. (as-dried) | 7.86 | 10.24 | 11.54 | 4.30 | 8.16 |
| | | 400° C. | 5.80 | 6.57 | 7.14 | 3.32 | 6.89 |
| | | 600° C. | 6.23 | 6.53 | 7.03 | 3.06 | 7.05 |
| | | 800° C. | 6.06 | 8.30 | 8.24 | 3.03 | 6.12 |
| | | 1000° C. | 3.79 | 1.00 | 1.00 | — | — |
| | Mismatch strain after drying $\Delta\varepsilon_{dry}$ (ppm) | | −126 | −106 | −91 | −130 | −195 |
| | Total mismatch strain A & Total at X ° C. (ppm) | 400° C. | 135 | 161 | 205 | 293 | 83 |
| | | 600° C. | 93 | 235 | 277 | 217 | 44 |
| | | 800° C. | 33 | 339 | 397 | 300 | 148 |
| | | 1000° C. | 124 | 561 | 616 | 735 | 301 |
| | Total mismatch strain A&Total after exposure to X ° C. (ppm) | 400° C. | −122 | −100 | −58 | −211 | −287 |
| | | 600° C. | −178 | −20 | 0 | −354 | −302 |
| | | 800° C. | −207 | 191 | 185 | −437 | −330 |
| | | 1000° C. | −447 | 647 | 819 | −851 | −607 |
| Honeycomb Body | Cell density (per m$^2$) | | 68 | 68 | 68 | 95 | 95 |
| | Wall thickness (mm) | | 0.13 | 0.12 | 0.12 | 0.10 | 0.10 |
| | Porosity (%) | | 34.89 | 34.62 | 34.18 | 34.25 | 33.66 |
| | Mean pore diameter (μm) | | 4.83 | 4.24 | 4.47 | 3.57 | 3.88 |
| | Young's Modulus of wall, 25° C. (GPa) | | 23.7 | 23.0 | 22.9 | 25.4 | 25.4 |

TABLE 7-continued

Characteristics of Low Fines Examples and HFS Samples Based on Temperature

|  |  | HFS Ex. 2A(1) | Ex. 2A(1) | Ex. 2A(2) | Ex. 2D | Ex. 2E |
|---|---|---|---|---|---|---|
| CTE to 800° C. (ppm/° C.) |  | 0.48 | 0.50 | 0.51 | 0.53 | 0.50 |
| Expansion to X | 400° C. | −59 | −51 | −41 | −36 | −6 |
| ° C. (ppm) | 600° C. | 106 | 117 | 131 | 128 | 176 |
|  | 800° C. | 327 | 358 | 364 | 344 | 414 |
|  | 1000° C. | 624 | 671 | 661 | 633 | 739 |

The Young's modulus and mismatch strain are determined as described above. The "Total mismatch strain $\Delta\varepsilon_{Total}$ after exposure to X° C." is determined by heating the sample to the indicated temperature and measuring the mismatch strain after the sample has cooled back to 25° C. The "Total mismatch strain $\Delta\varepsilon_{Total}$ at X° C." is determined by heating the sample at a heating rate of about 2° C./minute to 400° C., holding for 15 minutes, then cooling to 50° C. The cement skin is then heated to 600° C. at the same rate, held for 15 minutes, then cooled to 50° C. The process is repeated for heating to 800° C. and then 1000° C.

Figure 7B:
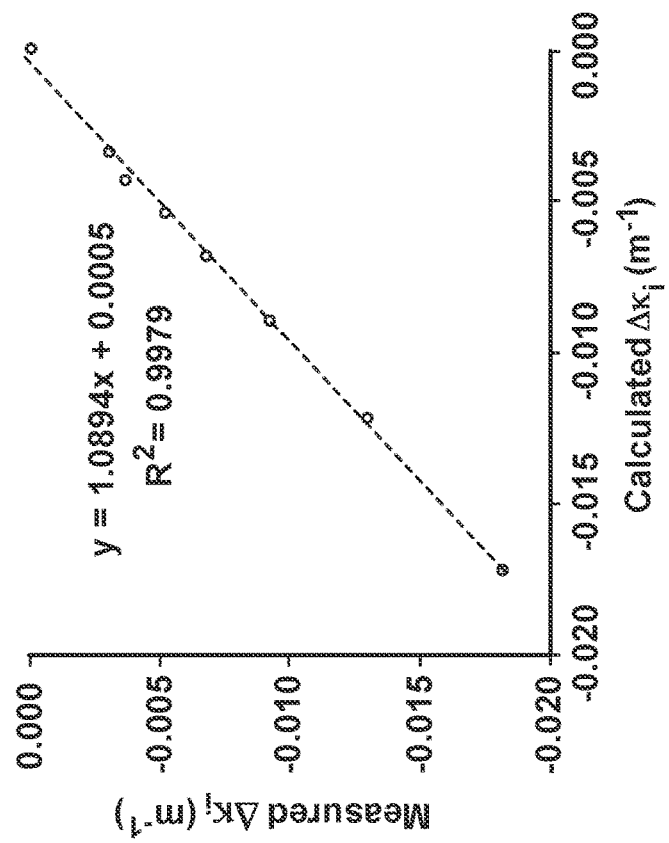
FIG. 7B is a plot of a linear regression analysis of the measured changes in curvature Δκ of the cement skin of FIG. 7A and calculated changes in curvature Δκ of the cement skin on a cellular ceramic, according to an aspect of the present disclosure.
Figure 7A:
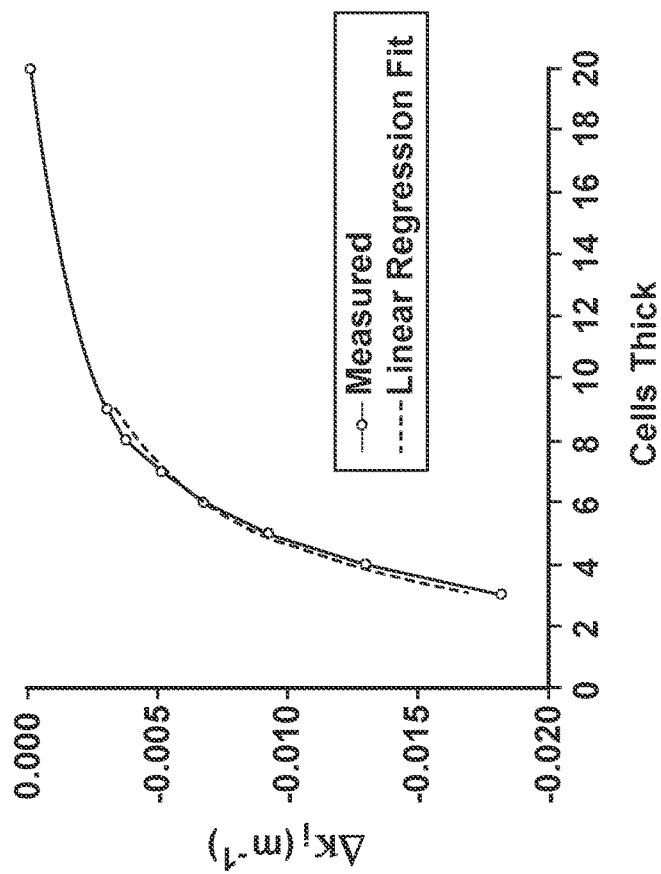
FIG. 7A is a plot of changes in curvature Δκ of a cement skin on a cellular ceramic as a function of cell thickness, according to an aspect of the present disclosure.

As described above, the mismatch strain is determined based on the changes in curvature $\Delta\kappa$ of the bilayer cement skin-ceramic substrate sample as the ceramic honeycomb cells are trimmed away. FIG. 7A illustrates an example of the changes in curvature $\Delta\kappa$ for Ex. 2A(2) as the honeycomb cells are trimmed away. The as-cut sample had 20 rows of cells normal to the cement skin. As shown in the plot in FIG. 7A, the first trimming reduced the number rows of cells to 9, resulting in detectable changes in the curvature $\Delta\kappa$ of the sample. Trimming proceeded row by row until 3 rows of cells remained. As shown in the plot in FIG. 7A, the curvature grew in magnitude with each trimming and became progressively more negative, indicating that the dried cement is in tension. As illustrated in FIG. 7B, the mismatch strain on drying $\Delta\varepsilon_{dry}$ was computed by regression fitting using formula (1) above and the thicknesses and elastic moduli of each layer. This process was performed for each of the samples in Table 7 to obtain the mismatch strain on drying $\Delta\varepsilon_{dry}$.

The measured curvature of the cement skin after drying and as a function of temperature were combined with the temperature-dependent elastic modulus of the cordierite ceramic of the honeycomb body, the temperature-dependent elastic modulus of the cement skin, and the thickness of the cement skin and the ceramic honeycomb to determine the mismatch strain between the cement skin and the ceramic honeycomb body as a function of temperature.

Figure 8A:
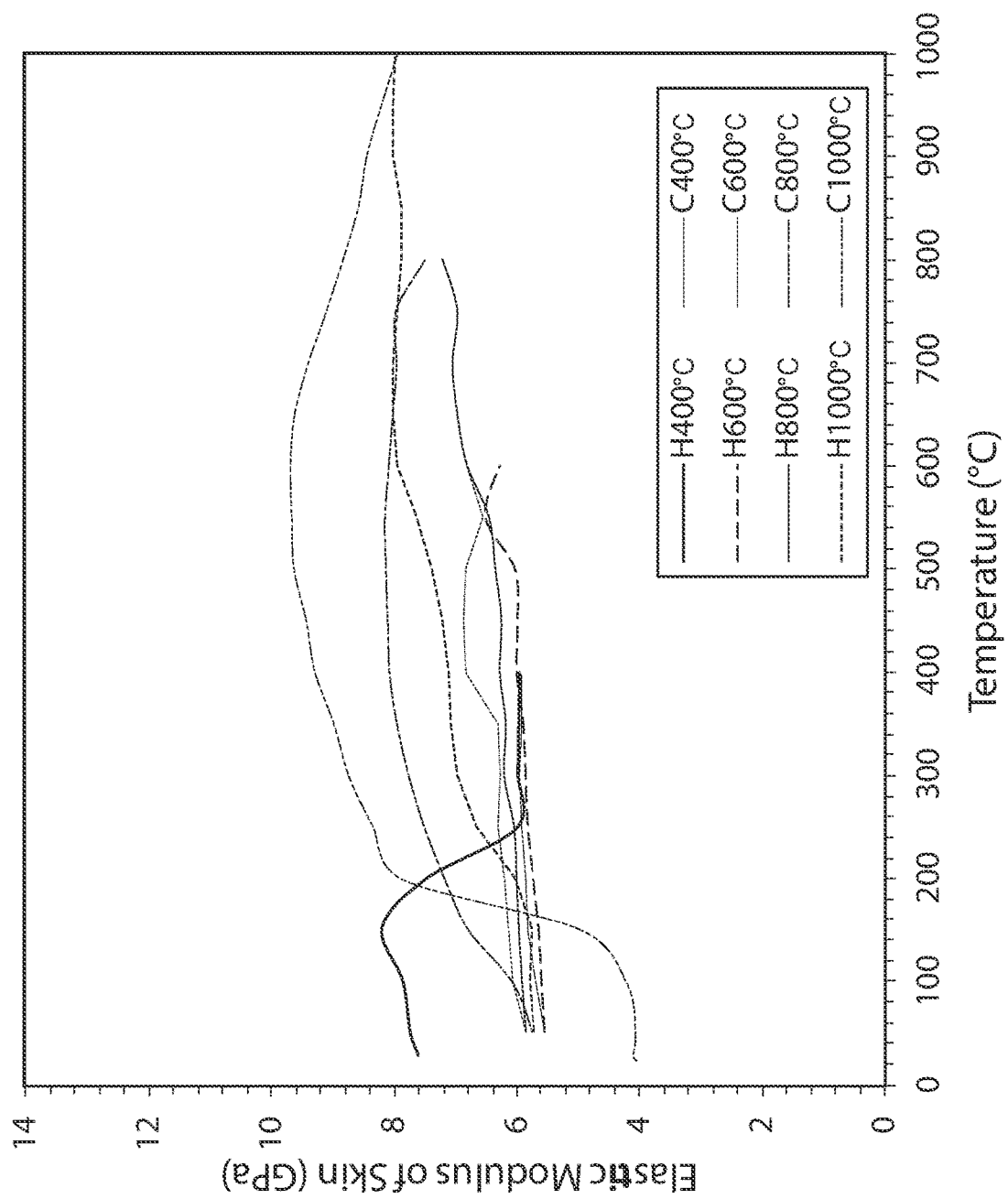
FIG. 8A is a plot of elastic modulus $E_s$ of a HFS cement skin as a function of temperature, according to an aspect of the present disclosure.
Figure 8B:
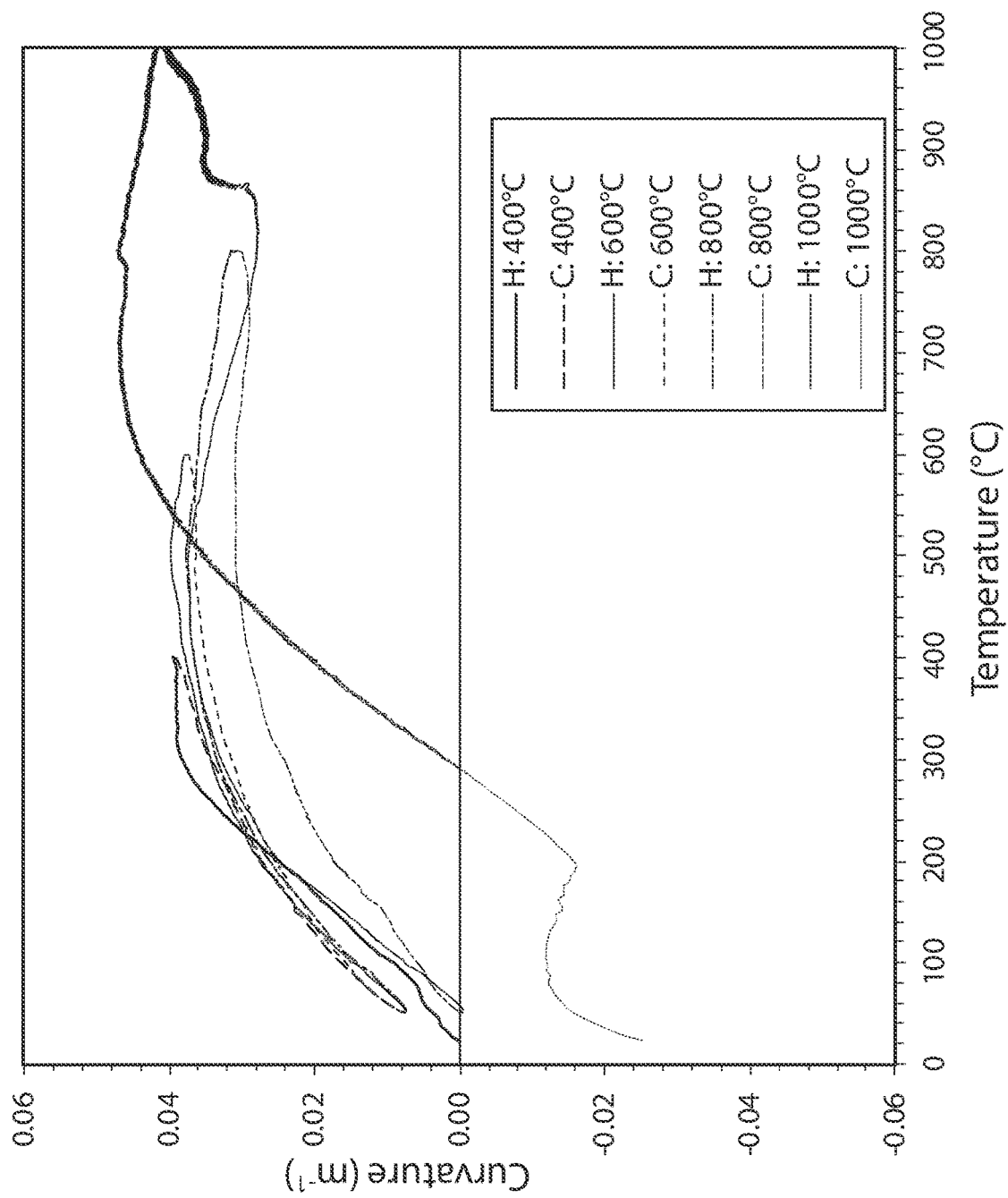
FIG. 8B is a plot of changes in curvature Δκ of the bilayer of HFS cement skin of FIG. 8A on a ceramic honeycomb body as a function of temperature of the honeycomb structure, according to an aspect of the present disclosure.
Figure 8C:
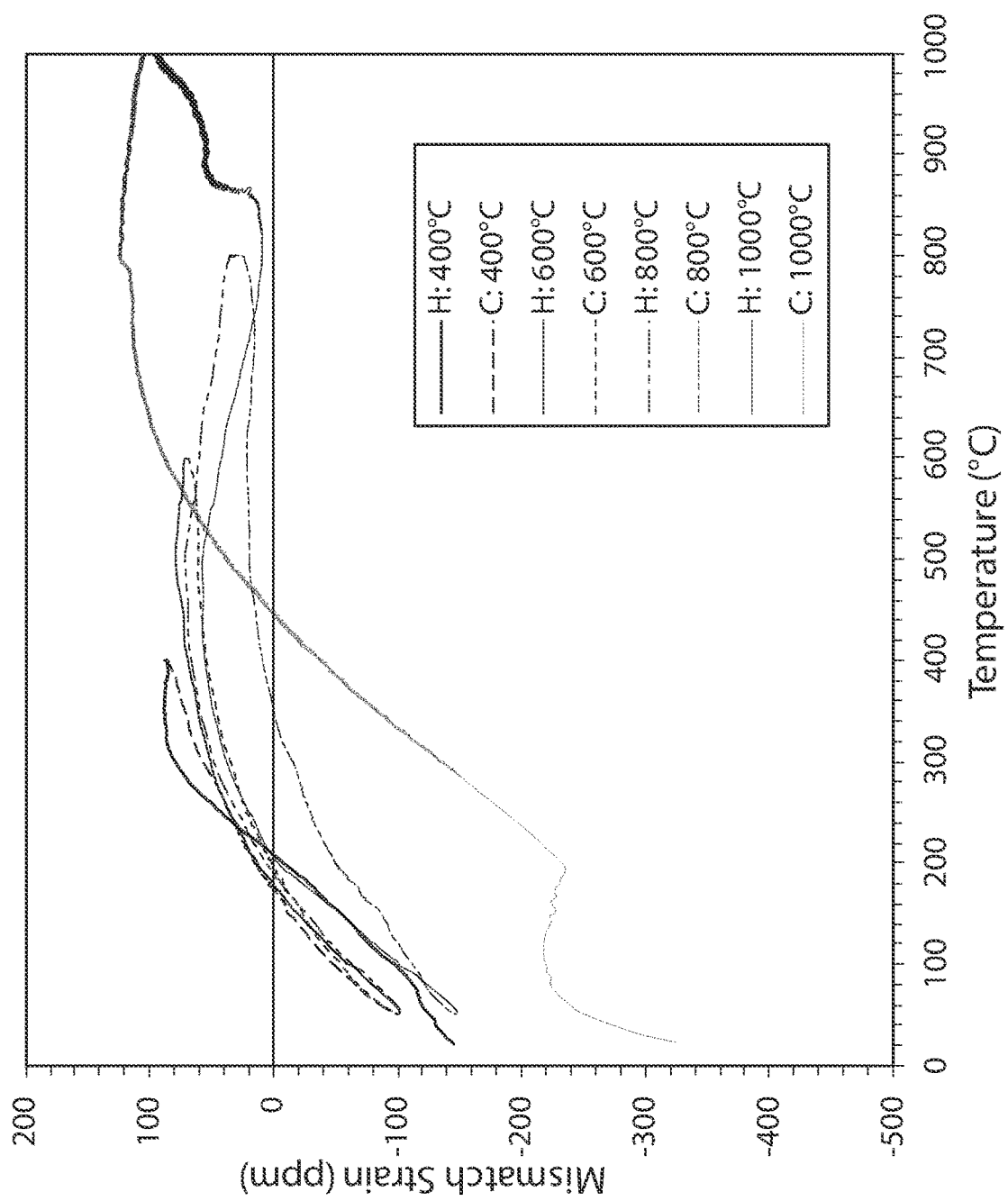
FIG. 8C is a plot of total mismatch strain $\Delta\varepsilon_{Total}$ of the HFS cement skin of FIG. 8A as a function of temperature of the honeycomb structure, according to an aspect of the present disclosure.
Figure 9A:
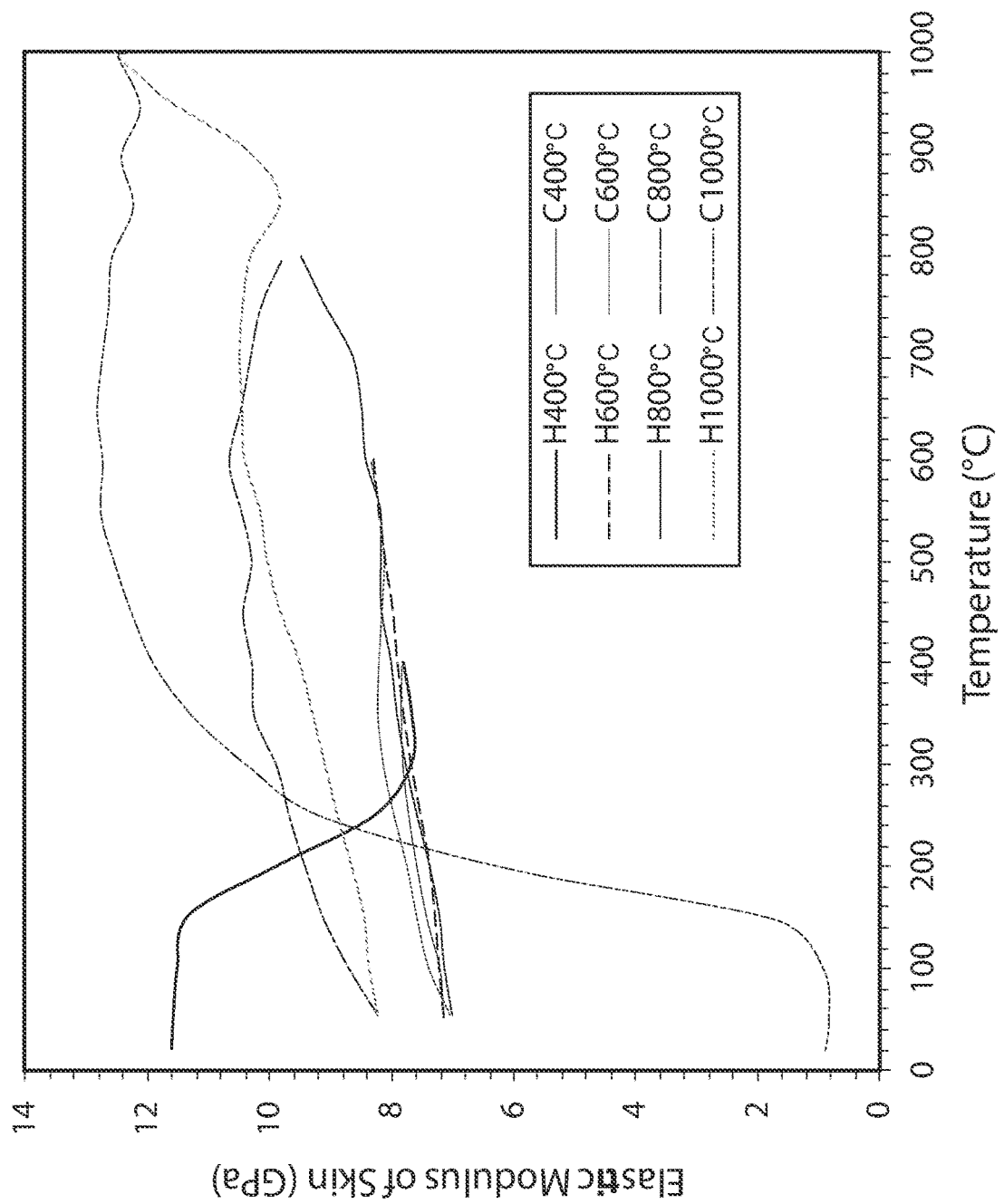
FIG. 9A is a plot of elastic modulus $E_s$ of an exemplary cement skin as a function of temperature, according to an aspect of the present disclosure.
Figure 9B:
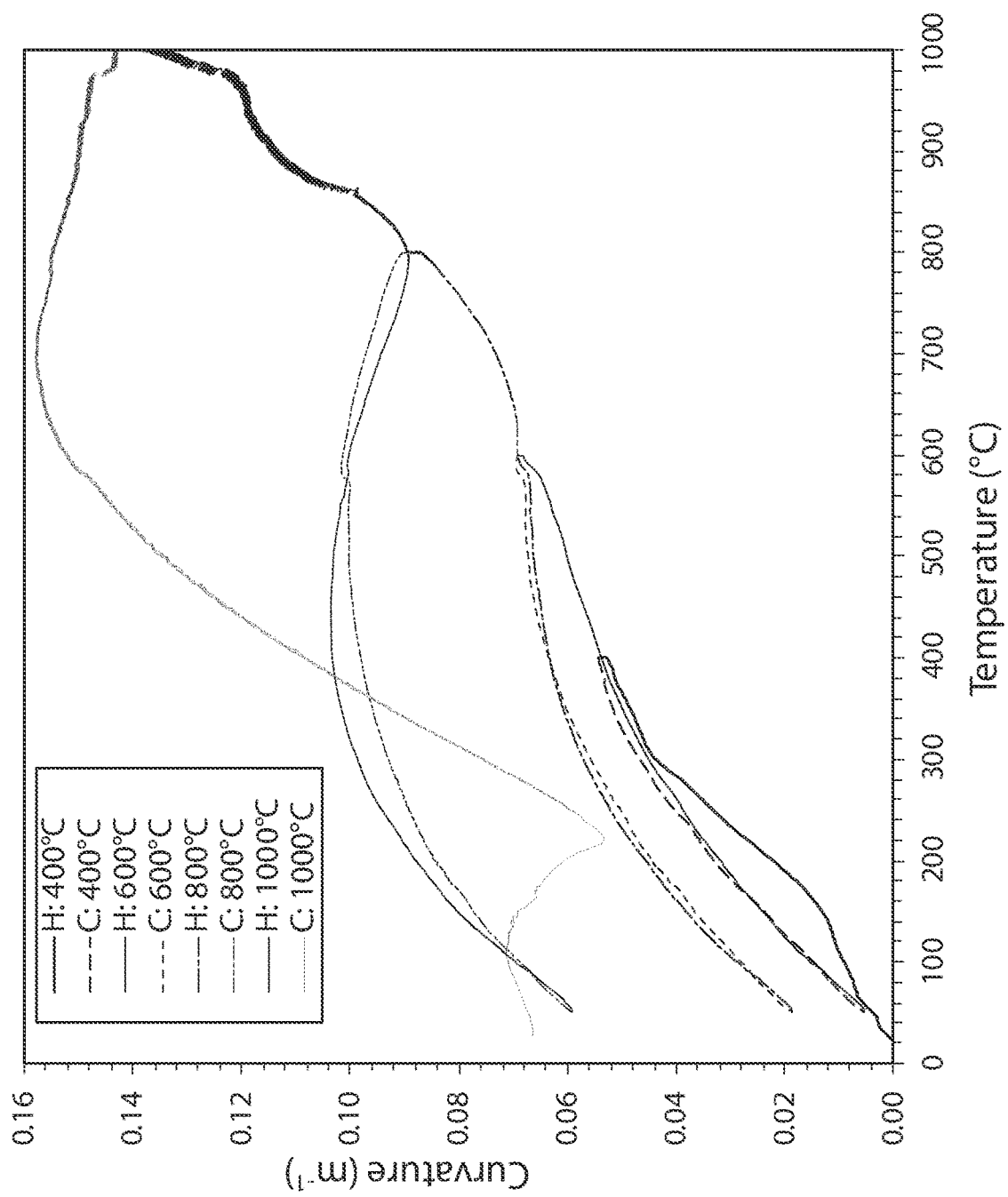
FIG. 9B is a plot of changes in curvature Δκ of the bilayer of the exemplary cement skin of FIG. 9A on a ceramic honeycomb body as a function of temperature of the honeycomb structure, according to an aspect of the present disclosure.
Figure 9C:
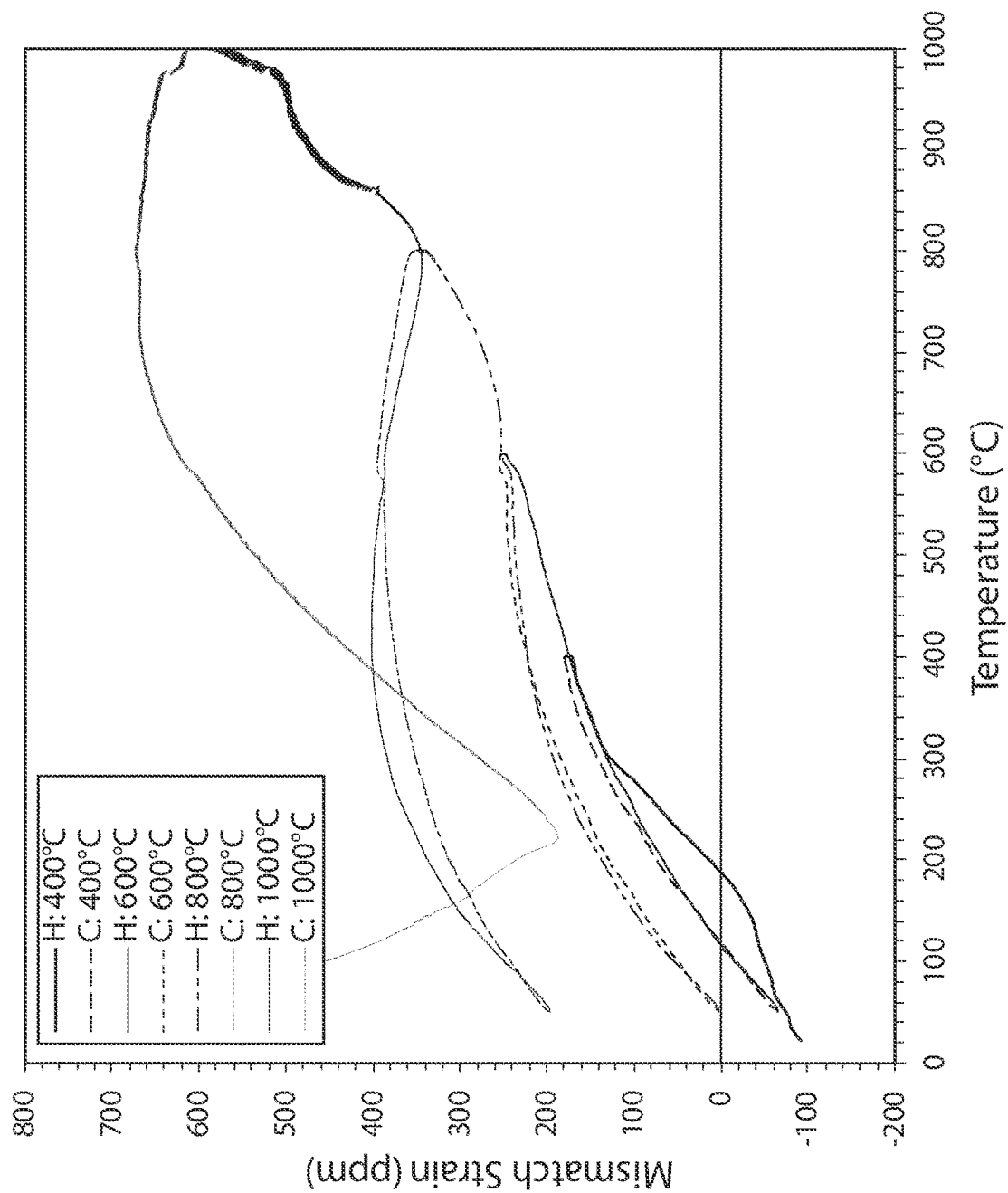
FIG. 9C is a plot of total mismatch strain $\Delta\varepsilon_{Total}$ of the exemplary cement skin of FIG. 9A as a function of temperature of the honeycomb structure, according to an aspect of the present disclosure.

FIGS. 8A-8C and FIGS. 9A-9C illustrate temperature dependent plots for HFS Ex. 2A(1) and Ex. 2A(2), respectively. FIGS. 8A and 9A illustrate the temperature dependency of the elastic modulus for HFS Ex. 2A(1) and Ex. 2A(2), respectively. FIGS. 8B and 9B illustrate the measured changes in curvature of bilayer samples of the cement skins of HFS Ex. 2A(1) and Ex. 2A(2) on ceramic substrates due to temperature. FIGS. 8C and 9C illustrate the measured total mismatch strain $\Delta\varepsilon_{Total}$ of the cement skin of HFS Ex. 2A(1) and Ex. 2A(2), respectively. For each measurement, the sample was heated at a rate of 2° C. per minute to a given soak temperature (first 400° C. and then 600° C., 800° C., and 1000° C., sequentially, in that order), held for 15 minutes at the given soak temperature, cooled to 50° C., then heated at the same rate to the next, higher soak temperature. This process was repeated for each temperature measured.

Exemplary plots of the results for HFS Ex. 2A(1) and Ex. 2A(2) are illustrated in FIGS. 8A-8C and FIGS. 9A-9C, respectively. In the figure legends for FIGS. 8A-8C and FIGS. 9A-9C, the letter "H" followed by a number X corresponds to heating the sample of the indicated temperature X (° C.); the letter "C" followed by a number X corresponds to cooling the sample after heating to the indicated temperature X (° C.). Average results for HFS Ex. 2A(1), Ex. 2A(1), Ex. 2A(2), Ex. 2D, and Ex. 2E are shown in Table 7.

Referring again to FIGS. 9A-9C, the data for Ex. 2A(2) shows that after heating to each successively higher soak temperature, the tensile mismatch strain at 25° C. is reduced. The mismatch strain at 25° C. increases to about 0 after heating to 600° C. and then the mismatch strain becomes compressive upon heating to 800° C. The data shown in FIGS. 9A-9C suggests that the cement skins of the present disclosure can resist shrinkage upon heating and instead expand upon heating at some higher temperatures. Without wishing to be limited by any theory, it is believed that the expansion of the exemplary cement skin after exposure to temperatures ≥about 600° C. may contribute to the thermal shock resistance of the cement skins of the present disclosure. As discussed above, the thermal shock resistance test involves subjecting the cement skin to rapid cooling while the ceramic honeycomb body remains hot. It is believed that the expansion of the exemplary cement skins can decrease the mismatch strain between the cooled cement skin and the hot ceramic honeycomb body, and thus contribute to the improved ability of the cement skin to withstand thermal shock at higher temperatures without cracking at higher temperatures.

In contrast, FIGS. 8A-8C show that the HFS example, HFS Ex. 2A(1) exhibits a mismatch strain at 25° C. that remains about the same after drying and after heating to higher soak temperatures. Without being limited by any particular theory, it is believed that the HFS cement skin, which includes higher amounts of fine colloidal particles, experiences sintering at temperatures ≥800° C., which can contribute to contraction of the cement skin, resulting in an increased likelihood of cracking.

Figure 10C:
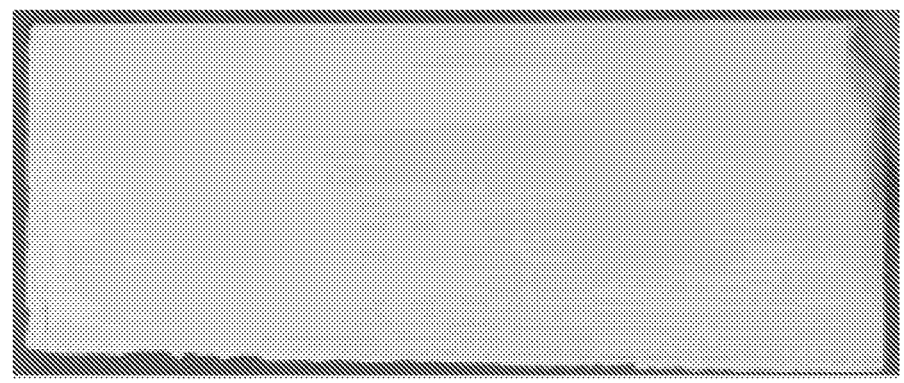
FIG. 10C is photograph of a cross-section of an exemplary cement skin on a ceramic honeycomb body, according to an aspect of the present disclosure.
Figure 10B:
FIG. 10B is photograph of a cross-section of a HFS cement skin on a ceramic honeycomb body.
Figure 10A:
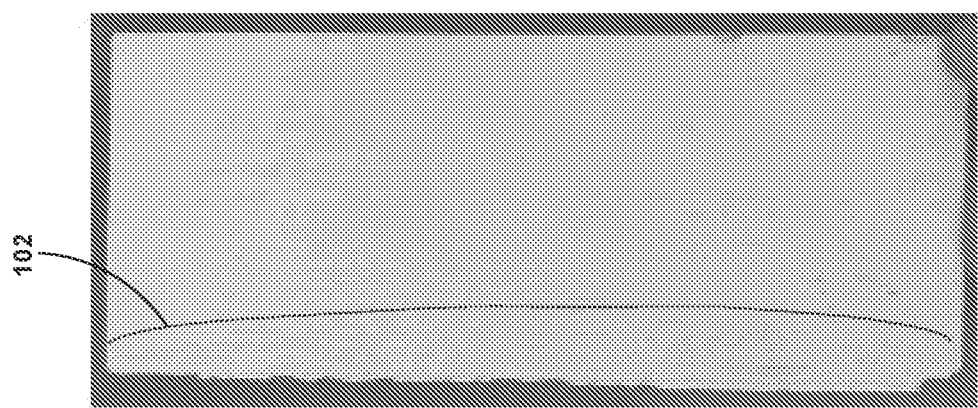
FIG. 10A is photograph of a cross-section of a HFS cement skin on a ceramic honeycomb body.

Referring now to FIGS. 10A-10C, a cross-sectional view of HFS Ex. 2A(1), HFS Ex. 2A(2), and Ex. 2A(1) is shown. As can be seen in FIGS. 10A and 10B, as indicated by lines 102 and 104, respectively, staining of the honeycomb body is visible for both HFS Ex. 2A(1) and HFS Ex. 2A(2). Staining of the honeycomb body indicates that at least a portion of the cement skin composition has migrated into the honeycomb body. In contrast, FIG. 10C does not show any significant visible staining of the honeycomb by the cement skin composition for Ex. 2A(1).

Figure 11:
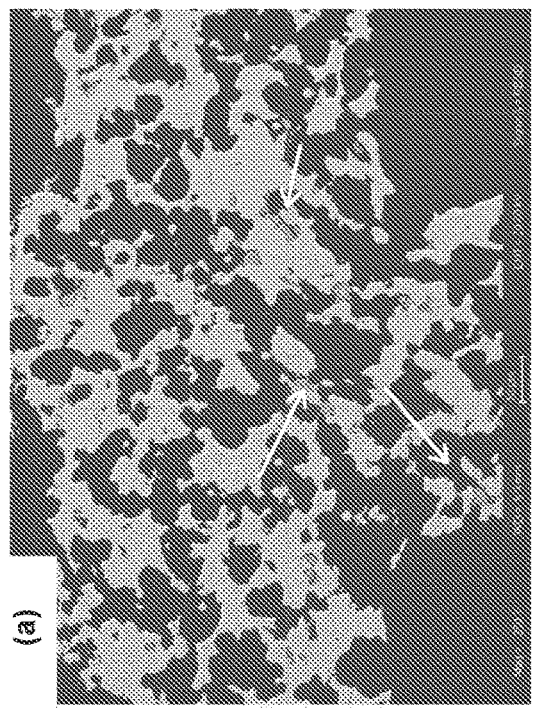
FIG. 11 illustrates scanning electron microscope (SEM) images of first, second, and third webs of a HFS sample having a high fine silica cement skin on a ceramic honeycomb body, where the first, second, and third webs are in order of distance from the applied HFS cement skin.
Figure 11:
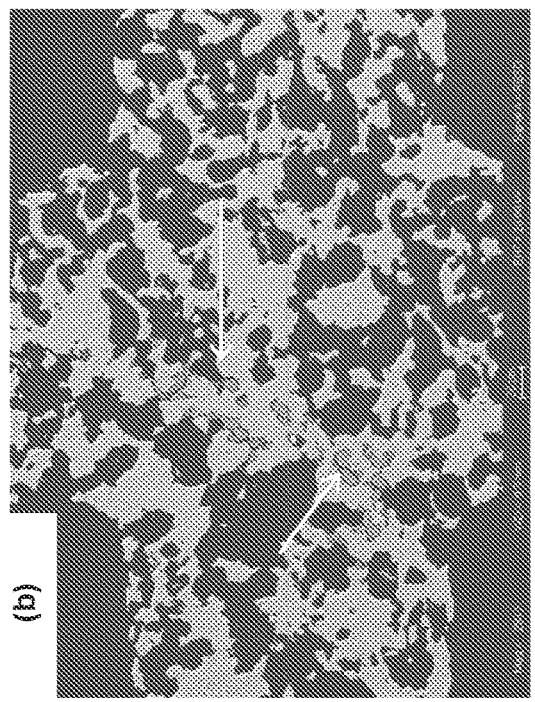
Figure 11:
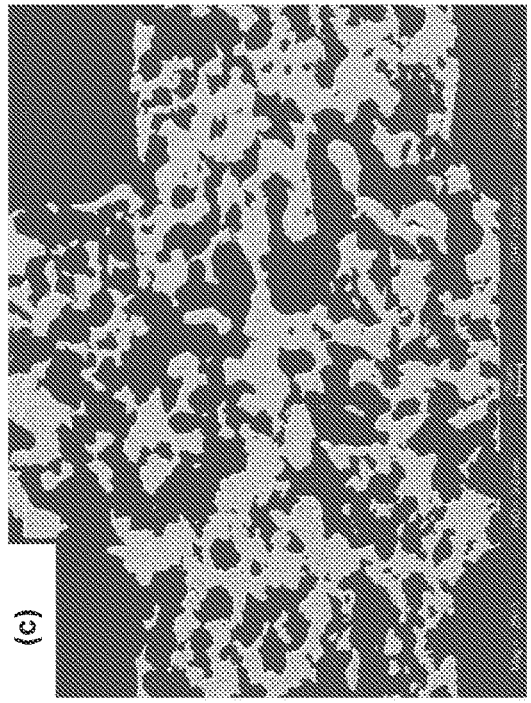
Figure 12:
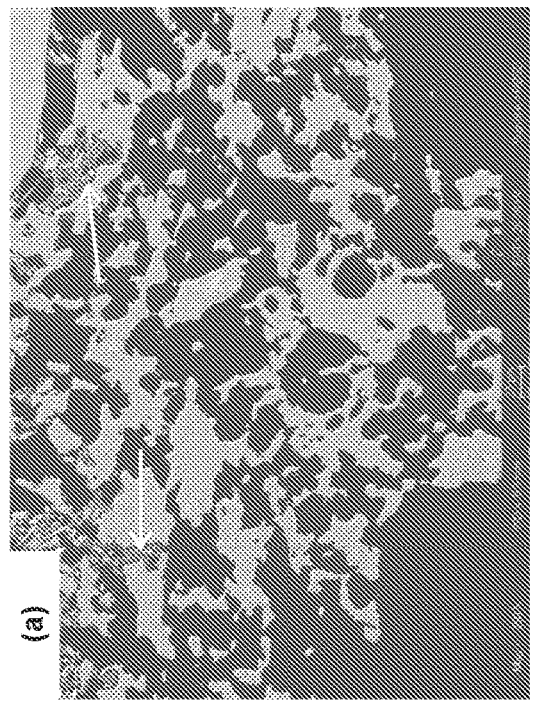
FIG. 12 illustrates scanning electron microscope (SEM) images of first, second, and third webs of an exemplary sample having an exemplary cement skin on a ceramic honeycomb body, where the first, second, and third webs are in order of distance from the applied exemplary cement skin, according to an aspect of the present disclosure.
Figure 12:
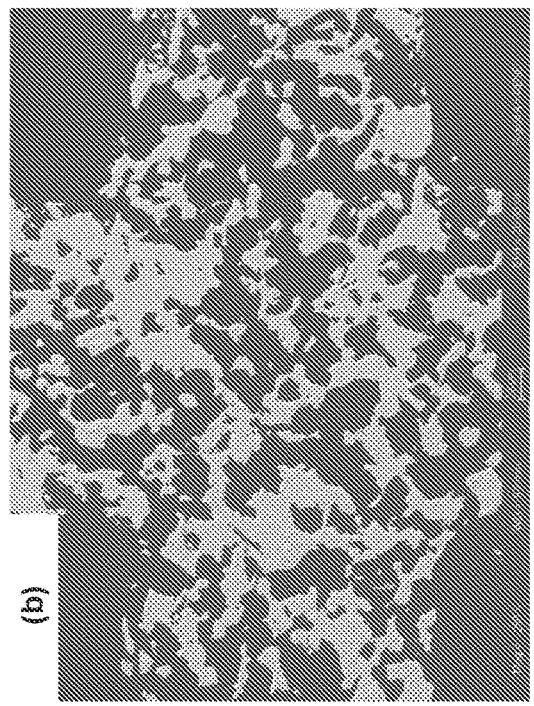
Figure 12:
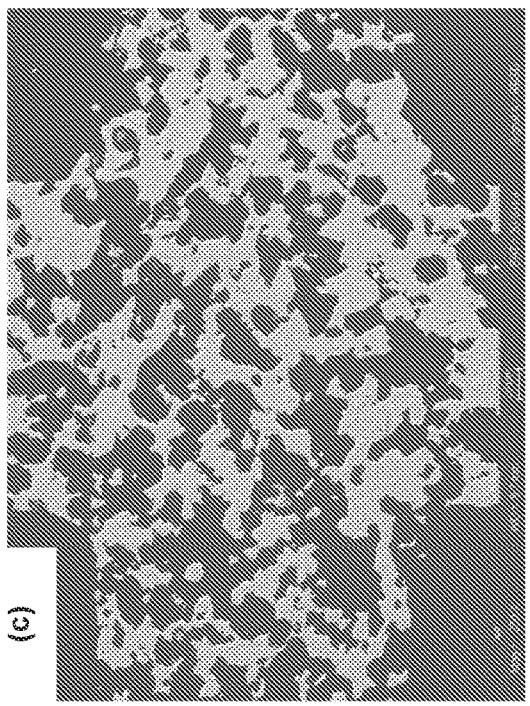

FIGS. 11 and 12 show scanning electron microscope (SEM) micrographs of different webs, indicated by panels (a)-(c), taken from HFS Ex. 2A(1) and Ex. 2A(1), respectively. Each web is a slice of the honeycomb body at increasing distance from the interface between the cement skin and the honeycomb body with the web closest to the cement skin shown in panel (a) of each figure. As shown by the arrows in panels (a) and (b) of FIG. 11, colloidal silica particles of the comparative cement skin composition are visible in both the first and second webs of the honeycomb, respectively, indicating migration of the colloidal silica particles into the honeycomb matrix. In contrast, FIG. 12 shows colloidal silica particles of the cement skin composition of the present disclosure present only in the first web, panel (a), indicating less migration of colloidal silica particles into the honeycomb matrix.

The SEM micrographs of FIGS. 11 and 12 were obtained using a Zeiss 1550VP scanning electron micrograph at 20 kV and 250× magnification. The samples were prepared by obtaining a cross-section and embedding epoxy into the porous sample (dark color in background and pores). The samples were polished after curing of the epoxy and a conductive carbon coating was evaporated onto the samples to reduce charging.

Without wishing to be limited by any theory, it is believed that high concentrations of fine colloidal inorganic particles, such as is present in HFS examples HFS Ex. 2A(1) and 2A(2), can result in phase separation of the colloidal suspension due to interactions with the organic binder. It is also believed that migration of the fine colloidal inorganic particles into the underlying ceramic substrate may occur, possibly due to capillary forces as a result of the pores in the ceramic. As discussed above, migration of the fine colloidal inorganic particles into the ceramic matrix can increase the likelihood of cracking of the cement skin. The cement skin compositions of the present disclosure replace at least some of the fine colloidal inorganic particles with the intermediate-sized inorganic particles, which results in a decrease in migration of fine colloidal particles into the ceramic, while still providing a cement skin composition that can satisfy desired strength and thermal resistance requirements.

The following non-limiting aspects are encompassed by the present disclosure:

According to a first aspect of the present disclosure, a cement composition for application to a ceramic substrate includes: a first source of inorganic particles having a mean particle diameter <50 nm, wherein the first source of inorganic particles is present at about ≤15% (by dry weight); a second source of inorganic particles having a mean particle diameter of from about 50 nm to about 700 nm, wherein the second source of inorganic particles is present at from about 5% to about 15% (by dry weight); an inorganic fibrous material present at about ≤15% (based on dry weight); and a water-soluble organic binder, wherein the amount of at least one of the first source of inorganic particles or the inorganic fibrous material is greater than 0% (by dry weight).

According to a second aspect of the present disclosure, the cement composition of aspect 1, wherein the first source of inorganic particles is present at about ≤9% (by dry weight).

According to a third aspect of the present disclosure, the cement composition of aspect 1 or aspect 2, wherein the first source of inorganic particles has a mean particle diameter <20 nm.

According to a fourth aspect of the present disclosure, the cement composition of any one of aspect 1 to aspect 3, wherein the first source of inorganic particles includes colloidal silica, colloidal alumina, or a combination thereof.

According to a fifth aspect of the present disclosure, the cement composition of any one of aspect 1 to aspect 4, wherein the second source of inorganic particles includes at least one of silica, alumina, titania, spinel, and zirconia particles.

According to a sixth aspect of the present disclosure, the cement composition of any one of aspect 1 to aspect 4, wherein the second source of inorganic particles has a mean particle diameter of from about 100 nm to about 500 nm.

According to a seventh aspect of the present disclosure, the cement composition of any one of aspect 1 to aspect 6, further including: a pH modifier, a rheology modifier, or a combination thereof.

According to an eighth aspect of the present disclosure, the cement composition of aspect 7, wherein the pH modifier includes one of sodium hydroxide and potassium hydroxide.

According to a ninth aspect of the present disclosure, the cement composition of aspect 7, wherein the rheology modifier includes a smectite clay.

According to a tenth aspect of the present disclosure, the cement composition of any one of aspect 1 to aspect 10, wherein the composition is substantially free of inorganic fibrous material.

According to an eleventh aspect of the present disclosure, the cement composition of any one of aspect 1 to aspect 11, further including: a third source of inorganic particles including inorganic particles in which at least 90% of the inorganic particles are retained by a mesh sieve having sieve openings <1 μm.

According to a twelfth aspect of the present disclosure, the cement composition of aspect 11, wherein the third source of inorganic particles includes fused silica, cordierite, aluminum titanate, alumina, silicon carbide, or combinations thereof.

According to a thirteenth aspect of the present disclosure, the cement composition of any one of aspect 1 to aspect 12, wherein the inorganic fibrous material includes an alkaline earth silicate, wollastonite, or mullite.

According to a fourteenth aspect of the present disclosure, the cement composition of any one of aspect 1 to aspect 13, wherein the inorganic fibrous material includes an aspect ratio of longest axis to shortest axis of >5:1.

According to a fifteenth aspect of the present disclosure, the cement composition of any one of aspect 1 to aspect 14, wherein the water-soluble organic binder includes at least one of methylcellulose, cellulose ether, ethylcellulose, polyvinyl alcohol, polyethylene oxide, xanthum gum, or latex.

According to a sixteenth aspect of the present disclosure, a honeycomb structure, includes: a ceramic honeycomb body including opposing first and second end faces and a plurality of intersecting walls defining a plurality of cells extending axially between the first and second end faces; and a cement skin disposed on at least a portion of a periphery of the body, wherein the cement skin is derived from a composition including: a first source of inorganic particles having a mean particle diameter <50 nm, wherein the first source of inorganic particles is present at about ≤15% (by dry weight); a second source of inorganic particles having a mean particle diameter of from about 50 nm to about 700 nm, wherein the second source of inorganic particles is present at from about 5% to about 15% (by dry weight); an inorganic fibrous material present at about ≤15% (based on dry weight); and a water-soluble organic binder, wherein the amount of at least one of the first source of inorganic particles or the inorganic fibrous material is greater than 0% (by dry weight).

According to a seventeenth aspect of the present disclosure, the honeycomb structure of aspect 16, wherein a total mismatch strain $\Delta\varepsilon_{Total}$ between the body and the cement skin is greater than 50 ppm, as measured at 800° C.

According to an eighteenth aspect of the present disclosure, the honeycomb structure of aspect 17, wherein a total mismatch strain $\Delta\varepsilon_{Total}$ between the body and the cement skin, as measured at 25° C. after drying of the cement skin, is greater than −120 ppm.

According to a nineteenth aspect of the present disclosure, the honeycomb structure of aspect 17, wherein a total mismatch strain $\Delta\varepsilon_{Total}$ between the body and the cement skin, as measured at 25° C. after heating to a temperature of between 400° C. and 800° C., is increased by at least 10 ppm compared to the mismatch strain after drying $\Delta\varepsilon_{dry}$ between the body and the cement skin as measured at 25° C. after drying of the cement skin.

According to a twentieth aspect of the present disclosure, the honeycomb structure of aspect 19, wherein the inorganic fibrous material includes an alkaline earth silicate, wollastonite, or mullite.

According to a twenty-first aspect of the present disclosure, the honeycomb structure of any one of aspect 16 to aspect 20, wherein the cement skin composition is substantially free of inorganic fibrous material.

According to a twenty-second aspect of the present disclosure, the honeycomb structure of any one of aspect 16 to aspect 21, wherein the first source of inorganic particles has a mean particle diameter <20 nm.

According to a twenty-third aspect of the present disclosure, the honeycomb structure of any one of aspect 16 to aspect 22, wherein the first source of inorganic particles includes colloidal silica, colloidal alumina, or a combination thereof.

According to a twenty-fourth aspect of the present disclosure, the honeycomb structure of any one of aspect 16 to aspect 23, wherein the second source of inorganic particles includes at least one of silica, alumina, titania, spinel, and zirconia particles.

According to a twenty-fifth aspect of the present disclosure, the honeycomb structure of any one of aspect 16 to aspect 24, further including: a third source of inorganic particles including inorganic particles in which at least 90% of the inorganic particles are retained by a mesh sieve having sieve openings <1 μm.

According to a twenty-sixth aspect of the present disclosure, the honeycomb structure of aspect 25, wherein the third source of inorganic particles includes fused silica, cordierite, aluminum titanate, alumina, silicon carbide, or combinations thereof.

According to a twenty-seventh aspect of the present disclosure, the honeycomb structure of any one of aspect 16 to aspect 26, wherein the water-soluble organic binder includes methylcellulose, cellulose ether, ethylcellulose, polyvinyl alcohol, polyethylene oxide, xanthum gum, latex, or combinations thereof.

In another aspect, in various embodiments a cement composition for application to a ceramic substrate is disclosed, comprising: a first source of inorganic particles having a mean particle diameter <50 nm, wherein the first source of inorganic particles is present at about ≤15% (by dry weight); a second source of inorganic particles having a mean particle diameter of from about 50 nm to about 700 nm, wherein the second source of inorganic particles is present at from about 5% to about 15% (by dry weight); an inorganic fibrous material present at about ≤15% (based on dry weight); and a water-soluble organic binder, wherein the amount of at least one of the first source of inorganic particles or the inorganic fibrous material is greater than 0% (by dry weight). In some of the above embodiments, the first source of inorganic particles is present at about ≤9% (by dry weight), and in some of these embodiments the first source of inorganic particles has a mean particle diameter <20 nm. in some of the above embodiments, the first source of inorganic particles comprises colloidal silica, colloidal alumina, or a combination thereof. In some of the above embodiments, the second source of inorganic particles comprises at least one of silica, alumina, titania, spinel, and zirconia particles. In some of the above embodiments, the second source of inorganic particles has a mean particle diameter of from about 100 nm to about 500 nm. in some of the above embodiments, the cement composition further comprises a pH modifier, a rheology modifier, or a combination thereof; in some embodiments, the pH modifier comprises one of sodium hydroxide and potassium hydroxide; in some embodiments, the rheology modifier comprises a smectite clay. In some of the above embodiments, the composition is substantially free of inorganic fibrous material. In some of the above embodiments, the cement composition further comprises a third source of inorganic particles comprising inorganic particles in which at least 90% of the inorganic particles are retained by a mesh sieve having sieve openings <1 μm; in some of these embodiments, the third source of inorganic particles comprises fused silica, cordierite, aluminum titanate, alumina, silicon carbide, or combinations thereof. In some of the above embodiments, the inorganic fibrous material comprises an alkaline earth silicate, wollastonite, or mullite. In some of the above embodiments, the inorganic fibrous material comprises an aspect ratio of longest axis to shortest axis of >5:1. In some of the above embodiments, the water-soluble organic binder comprises at least one of methylcellulose, cellulose ether, ethylcellulose, polyvinyl alcohol, polyethylene oxide, xanthum gum, or latex.

In another aspect, various embodiments of a honeycomb structure are disclosed herein comprising: a ceramic honeycomb body comprising opposing first and second end faces and a plurality of intersecting walls defining a plurality of cells extending axially between the first and second end faces; and a cement skin disposed on at least a portion of a periphery of the body, wherein the cement skin is derived from a composition comprising: a first source of inorganic particles having a mean particle diameter <50 nm, wherein the first source of inorganic particles is present at about ≤15% (by dry weight); a second source of inorganic particles having a mean particle diameter of from about 50 nm to about 700 nm, wherein the second source of inorganic particles is present at from about 5% to about 15% (by dry weight); an inorganic fibrous material present at about ≤15% (based on dry weight); and a water-soluble organic binder, wherein the amount of at least one of the first source of inorganic particles or the inorganic fibrous material is greater than 0% (by dry weight). In some of these embodiments, a total mismatch strain $\Delta\varepsilon_{Total}$ between the body and the cement skin is greater than 50 ppm, as measured at 800° C.; in some of these embodiments, a total mismatch strain $\Delta\varepsilon_{Total}$ between the body and the cement skin, as measured at 25° C. after drying of the cement skin, is greater than −120 ppm, or a total mismatch strain $\Delta\varepsilon_{Total}$ between the body and the cement skin, as measured at 25° C. after heating to a temperature of between 400° C. and 800° C., is increased by at least 10 ppm compared to the mismatch strain after drying $\Delta\varepsilon_{dry}$ between the body and the cement skin as measured at 25° C. after drying of the cement skin; in some embodiments, the inorganic fibrous material comprises an alkaline earth silicate, wollastonite, or mullite. In some of the above embodiments, the cement skin composition is substantially free of inorganic fibrous material. In some of the above embodiments, the first source of inorganic particles has a mean particle diameter <20 nm. in some of the above embodiments, the first source of inorganic particles comprises colloidal silica, colloidal alumina, or a combination thereof. In some of the above embodiments, the second source of inorganic particles comprises at least one of silica, alumina, titania, spinel, and zirconia particles. In some of the above embodiments, the honeycomb structure further comprises a third source of inorganic particles comprising inorganic particles in which at least 90% of the inorganic particles are retained by a mesh sieve having sieve openings <1 μm; in some of these embodiments, the third source of inorganic particles comprises fused silica, cordierite, aluminum titanate, alumina, silicon carbide, or combinations thereof. In some of the above embodiments, the water-soluble organic binder comprises methylcellulose, cellulose ether, ethylcellulose, polyvinyl alcohol, polyethylene oxide, xanthum gum, latex, or combinations thereof.

In yet another aspect, various embodiments of a ceramic cement mixture are disclosed herein comprising: a plurality of inorganic materials and one or more organic materials, such that the organic and inorganic materials together constitute a dry total weight; wherein the plurality of inorganic particles comprises intermediate inorganic particles having a median particle diameter in the range of 50 nm to 700 nm present at from 5% to 15% by dry total weight, wherein the plurality of inorganic particles comprises coarse inorganic particles having a minimum particle size of 1 micrometer, at from 70 to 85% by dry total weight, wherein the plurality of inorganic particles optionally comprises fine inorganic particles having a median particle diameter <50 nm, at from 0% to 10% by dry total weight, and wherein the plurality of inorganic particles optionally comprises inorganic fibrous material from 0% to 10% by dry total weight. In some of these embodiments, the intermediate inorganic particles are comprised of silica. In some of these embodiments, the coarse inorganic particles are comprised of silica. In some of these embodiments, the fine inorganic particles are comprised of silica or alumina or a combination thereof. In some of these embodiments, the inorganic fibrous material is comprised of wollastonite, mullite, or a combination thereof. In some of these embodiments, at least one of the organic materials is a water-soluble organic binder. In some of these embodiments, at least one of the organic materials is a water-soluble cellulosic binder. In some of these embodiments, the ceramic cement mixture is free of inorganic fibrous material. In some of these embodiments, the ceramic cement mixture is free of fine inorganic particles having a particle diameter of less than 50 nm. In some of these embodiments, the plurality of inorganic materials comprises from 5 to 15 percent by dry total weight of silica with particle size of 50 and 700 nm. In some of these embodiments, the plurality of inorganic materials further comprises from 0.01 to 0.3% dry total weight of sodium hydroxide or potassium hydroxide or a combination thereof. In some of these embodiments, the inorganic fibrous material comprises fibers or whiskers with an aspect ratio greater than 5 which are present at 0.01% to less than 10% of dry total weight. In some of these embodiments, the inorganic fibrous material comprises fibers or whiskers with an aspect ratio greater than 5 which are present at 0.01% to less than 3% of dry total weight. In some of these embodiments, the coarse inorganic particles have particle sizes between 1 micrometer and 300 micrometers. In some of these embodiments, the ceramic cement mixture further comprises water, such that the water, the organic materials, and the inorganic materials together constitute a total weight, and the water is present at from 15% to 26% of total weight; in some of these embodiments, the ceramic cement mixture comprises less than 5% of total weight of fine inorganic material.

In various embodiments disclosed herein, coarse (or "large") inorganic particles comprise particles having a diameter >1 μm, >10 μm, >50 μm, or >100 μm. In some embodiments, the coarse inorganic particles comprise particles having a diameter of from about 1 μm to about 300 μm, about 1 μm to about 200 μm, about 1 μm to about 100 μm, about 10 μm to about 300 μm, about 10 μm to about 200 μm, about 10 μm to about 100 μm, about 100 μm to about 300 μm, or about 100 μm to about 200 μm. In some embodiments, the coarse particles are provided by −80/+105 mesh. In some embodiments, the coarse particles have a D1>125 microns and a D 90<177 microns. In some embodiments, the coarse particles have a D90<74 microns.

In various embodiments disclosed herein, the intermediate inorganic particles—second source have a median mean particle diameter of from about 50 nm to about 700 nm. in some embodiments, the intermediate inorganic particles are solid spherical nanoparticles having diameters in the range of about 2 nm to about 300 nm, with a median diameter of about 200 nm; in some of these embodiments the intermediate inorganic particles are silica soot particles such as produced during the formation of fused silica. In some embodiments, the intermediate inorganic particles have a median particle diameter of from about 50 nm to about 700 nm, about 50 nm to about 600 nm, about 50 nm to about 500 nm, about 50 nm to about 400 nm, about 50 nm to about 300 nm, about 50 nm to about 200 nm, about 100 nm to about 700 nm, about 100 nm to about 600 nm, about 100 nm to about 500 nm, about 100 nm to about 400 nm, about 100 nm to about 300 nm, about 100 nm to about 200 nm, about 200 nm to about 700 nm, about 200 nm to about 600 nm, about 200 nm to about 500 nm, about 200 nm to about 400 nm, about 200 nm to about 300 nm, about 300 nm to about 700 nm, about 300 nm to about 600 nm, about 300 nm to about 500 nm, about 300 nm to about 400 nm, about 400 nm to about 700 nm, about 400 nm to about 600 nm, about 400 nm to about 500 nm, about 500 nm to about 700 nm, or about 500 nm to about 600 nm.

In various embodiments disclosed herein, the fine inorganic particles have a median particle diameter <50 nm, and in some of these embodiments, have a particle size less than 300 nm. In some embodiments, the fine inorganic particles have a median particle diameter of 12 nm such as provided by Ludox® HS40 colloidal silica in water, or in some embodiments, the fine inorganic particles have a median particle diameter of 40 nm such as provided by Ludox® PW-50.

In yet another aspect, various embodiments of a honeycomb body are disclosed herein which are comprised of porous ceramic walls intersecting and arrayed in an x-y grid and forming cells in a z-direction, and an outer peripheral wall comprised of ceramic materials including a fine inorganic material having a median particle diameter <50 nm, the outer peripheral wall surrounding and in contact with an outermost portion of the intersecting x-y grid and extending in the z-direction, wherein an outermost ring of the intersecting walls further comprises the fine inorganic material, wherein intersecting walls located more than 2 cells away from the outer peripheral wall are free of fine inorganic material.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed. All such modifications and variations are intended to be included herein within the scope of this disclosure and protected by the following claims. It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cement composition for application to a ceramic substrate, comprising:
   a first source of inorganic particles having a mean particle diameter <50 nm, wherein an amount of the first source of inorganic particles is greater than 0% and about ≤12% (by dry weight);
   a second source of inorganic particles having a mean particle diameter of from about 50 nm to about 700 nm, wherein an amount of the second source of inorganic particles is from about 5% to about 15% (by dry weight);
   an inorganic fibrous material, wherein an amount of the inorganic fibrous material is about ≤15% (based on dry weight); and
   a water-soluble organic binder.

2. The cement composition of claim 1, wherein an amount of the first source of inorganic particles is greater than 0% and about ≤9% (by dry weight).

3. The cement composition of claim 1, wherein the first source of inorganic particles has a mean particle diameter <20 nm.

4. The cement composition of claim 1, wherein the first source of inorganic particles comprises colloidal silica, colloidal alumina, or a combination thereof.

5. The cement composition of claim 1, wherein the second source of inorganic particles comprises at least one of silica, alumina, titania, spinel, and zirconia particles.

6. The cement composition of claim 1, wherein the second source of inorganic particles has a mean particle diameter of from about 100 nm to about 500 nm.

7. The cement composition of claim 1, further comprising:
   a pH modifier, a rheology modifier, or a combination thereof.

8. The cement composition of claim 7, wherein the pH modifier comprises one of sodium hydroxide and potassium hydroxide.

9. The cement composition of claim 7, wherein the rheology modifier comprises a smectite clay.

10. The cement composition of claim 1, wherein the composition is substantially free of inorganic fibrous material.

11. The cement composition of claim 1, further comprising:
    a third source of inorganic particles comprising inorganic particles in which at least 90% of the inorganic particles are retained by a mesh sieve having sieve openings <1 μm.

12. The cement composition of claim 11, wherein the third source of inorganic particles comprises fused silica, cordierite, aluminum titanate, alumina, silicon carbide, or combinations thereof.

13. The cement composition of claim 1, wherein the inorganic fibrous material comprises an alkaline earth silicate, wollastonite, or mullite.

14. The cement composition of claim 1, wherein the inorganic fibrous material comprises an aspect ratio of longest axis to shortest axis of >5:1.

15. The cement composition of claim 1, wherein the water-soluble organic binder comprises at least one of methylcellulose, cellulose ether, ethylcellulose, polyvinyl alcohol, polyethylene oxide, xanthum gum, or latex.

16. A cement composition for application to a ceramic substrate, comprising:
    a first source of inorganic particles having a mean particle diameter <50 nm, wherein an amount of the first source of inorganic particles is about ≤15% (by dry weight);
    a second source of inorganic particles having a mean particle diameter of from about 50 nm to about 700 nm, wherein an amount of the second source of inorganic particles is from about 5% to about 15% (by dry weight);
    a third source of inorganic particles comprising inorganic particles in which at least 90% of the inorganic particles are retained by a mesh sieve having sieve openings <1 μm;
    an inorganic fibrous material, wherein an amount of the inorganic fibrous material is about ≤15% (based on dry weight); and
    a water-soluble organic binder,
    wherein the amount of at least one of the first source of inorganic particles or the inorganic fibrous material is greater than 0% (by dry weight).

17. The cement composition of claim 16, wherein the second source of inorganic particles comprises at least one of silica, alumina, titania, spinel, and zirconia particles.

18. The cement composition of claim 16, wherein the second source of inorganic particles has a mean particle diameter of from about 100 nm to about 500 nm.

19. The cement composition of claim 16, wherein the third source of inorganic particles has a particle diameter >1 μm and an amount of the third source of inorganic particles is about >50% (by dry weight).

20. The cement composition of claim 16, wherein the third source of inorganic particles comprises fused silica, cordierite, aluminum titanate, alumina, silicon carbide, or combinations thereof.

* * * * *